(12) United States Patent
Shihoh

(10) Patent No.: US 10,951,135 B2
(45) Date of Patent: Mar. 16, 2021

(54) LINEAR DRIVING MECHANISM FOR DRIVING DRIVEN OBJECT, IMAGE PICKUP APPARATUS, LENS BARREL, AND STAGE MOVING APPARATUS

(71) Applicant: CANON KABUSHIKI KAISHA, Tokyo (JP)

(72) Inventor: Makoto Shihoh, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 328 days.

(21) Appl. No.: 16/003,768

(22) Filed: Jun. 8, 2018

(65) Prior Publication Data

US 2018/0367064 A1 Dec. 20, 2018

(30) Foreign Application Priority Data

Jun. 15, 2017 (JP) .............................. JP2017-117673

(51) Int. Cl.
*H02N 2/02* (2006.01)
*G03B 5/02* (2006.01)
(Continued)

(52) U.S. Cl.
CPC ............. *H02N 2/026* (2013.01); *F16H 21/44* (2013.01); *G03B 5/00* (2013.01); *G03B 5/02* (2013.01);
(Continued)

(58) Field of Classification Search
CPC ........ G02B 7/102; G02B 7/08; G02B 13/009; G02B 7/10; G02B 15/14; G02B 27/646;
(Continued)

(56) References Cited

U.S. PATENT DOCUMENTS 5,150,260 A * 9/1992 Chigira .................... G02B 7/08
359/694
5,684,353 A * 11/1997 Fujimoto ............. H02N 2/0055
310/323.01
(Continued)

FOREIGN PATENT DOCUMENTS

JP 2015053766 A 3/2015
JP 2015133864 A 7/2015

*Primary Examiner* — William R Alexander
*Assistant Examiner* — Sharrief I Broome
(74) *Attorney, Agent, or Firm* — Rossi, Kimms & McDowell LLP

(57) ABSTRACT

A linear driving mechanism capable of moving a driven object smoothly and lengthening its service life. A first vibration element and a second vibration element sandwich a friction member therebetween. A first holding member holding the first vibration element is rotatably supported by a first shaft. A second holding member holding the second vibration element is rotatably supported by a second shaft. An urging part moves the first holding member and the second holding member to press these vibration elements against the friction member. A coupling member couples the first holding member with a driven object. A pressing part presses the coupling member against a moving body including the first and second holding members. A direction of a pressing force of the pressing part intersects with the first shaft when the coupling member couples with the first holding member.

14 Claims, 14 Drawing Sheets

(51) Int. Cl.
*F16H 21/44* (2006.01)
*G03B 5/00* (2006.01)
*H02N 2/00* (2006.01)

(52) U.S. Cl.
CPC ......... *H02N 2/0015* (2013.01); *H02N 2/0055* (2013.01); *G03B 2205/0046* (2013.01); *G03B 2205/0061* (2013.01)

(58) Field of Classification Search
CPC ...... G02B 7/09; G02B 13/0065; G02B 15/16; G02B 7/021; G02B 7/04; G02B 15/173; G02B 15/177; G02B 7/022; G02B 13/0075; G02B 23/2438; G02B 26/0875; G02B 3/14; G02B 7/005; G02B 7/023; H04N 5/23296; H04N 5/2254; H04N 5/23203; H04N 5/23212; H04N 5/2251; H04N 5/2252; H04N 5/23209; H04N 5/23287; H04N 2101/00; H04N 5/225; H04N 5/2253; H04N 5/2257; H04N 5/232; H04N 5/23216; H04N 5/23258; H04N 5/232939; H04N 2201/0084; H04N 5/22525; H04N 5/2256; H04N 5/23206; G03B 3/10; G03B 5/00; G03B 2205/0046; G03B 17/04; G03B 17/14; G03B 2205/0053; G03B 13/34; G03B 13/36; G03B 17/12; G03B 2205/0007; G03B 2205/0061; G03B 2205/0069; G03B 29/00; G03B 5/02; G03B 13/32; G03B 17/56; G03B 17/565; G03B 21/142; G03B 21/53; G03B 2205/00
See application file for complete search history.

(56) References Cited

U.S. PATENT DOCUMENTS

| | | | |
|---|---|---|---|
| 8,503,118 B2* | 8/2013 | Wakayama | G02B 27/0068 359/823 |
| 8,643,962 B2* | 2/2014 | Miya | G02B 7/04 359/823 |
| 9,397,586 B2 | 7/2016 | Yamasaki | |
| 2003/0095337 A1* | 5/2003 | Tu | G02B 7/023 359/696 |
| 2005/0236931 A1* | 10/2005 | Sakano | H02N 2/004 310/323.17 |
| 2006/0043824 A1* | 3/2006 | Sakano | H02N 2/004 310/323.09 |
| 2011/0241487 A1* | 10/2011 | Mukae | H02N 2/0055 310/323.02 |
| 2015/0200610 A1* | 7/2015 | Yamasaki | G02B 7/08 359/824 |
| 2016/0320586 A1* | 11/2016 | Moon | G02B 7/10 |

* cited by examiner

MODE A

MODE B

LINEAR DRIVING MECHANISM FOR DRIVING DRIVEN OBJECT, IMAGE PICKUP APPARATUS, LENS BARREL, AND STAGE MOVING APPARATUS

DESCRIPTION OF THE RELATED ART

An ultrasonic motor, which includes a piezoelectric element for converting electrical energy to mechanical energy, has many advantageous features. For example, the motor can work silently, have a wide range of driving speed, and produce a high torque. An ultrasonic motor is set to be pressed against a driven object so that the motor drives the driven object using frictional force. This means that the motor keeps holding the driven object even when the motor is not powered. This is another advantageous feature. Considering these advantageous features, ultrasonic motors are used m equipments requiring precise driving. For example, an ultrasonic motor is advantageously used as a driver for a lens of a lens barrel of a camera (See Japanese Laid-Open Patent Publication (kokai) No. 2015-133864, for example). The disclosed ultrasonic motor includes a vibration element with a piezoelectric element attached thereto. The vibration element which generates ultrasonic vibrations, is pressed against an elongated friction member so that the vibration element moves linearly relative to the friction member due to the ultrasonic vibrations. The vibration element is coupled to a holding member for holding the lens so that the vibration element moving along the friction member drives the lens in the longitudinal direction of the friction member (the direction of the optical axis).

A linear driving mechanism with a plurality of ultrasonic motors has been developed because the driving force increases in proportional to the number of ultrasonic motors (See Japanese Laid-Open Patent Publication (kokai) No. 2015-53766, for example). The disclosed linear driving mechanism includes a moving body in which an elongated friction member is sandwiched between upper and lower holding members. Each holding member presses a vibration element against the friction member. When each vibration element generates ultrasonic vibrations, a spheroidal motion of a contact portion of the vibration element pressed against the friction member is generated so that the vibration element is driven relative to the frictional member using frictional force, whereby the vibration element together with its holding member is driven linearly in the longitudinal direction of the friction member. This drives a driven object coupled to the moving body in the longitudinal direction of the friction member.

FIG. 14 is a cross-sectional view schematically showing an arrangement of a conventional linear driving mechanism with two ultrasonic motors. In a linear driving mechanism 140, a friction member 141 is disposed between an upper base 142 and a lower base 143 as shown. The upper base 142 can move around a first shaft 144 disposed parallel to the friction member 141, and the lower base 143 can move around a second shaft 145 disposed parallel to the friction member 141. To couple the upper base 142 and the lower base 143, a coil spring 146 is suspended on edges in the side opposite to the side with the rotation centers of the upper and lower bases 142 and 143. The coil spring 146 pulls rotationally the upper base 142 and the lower base 143 so that the upper and lower bases 142 and 143 come close to each other. A vibration element unit 147 is disposed between the upper base 142 and the friction member 141, and a vibration element unit 148 is disposed between the lower base 143 and the friction member 141. The vibration element units 147 and 148 are pressed against the friction member 141 by the rotational movements of the upper and lower bases 142 and 143 around the shafts 144 and 145 respectively. When the vibration element units 147 and 148 generate ultrasonic vibrations to generate frictional force with the friction member 141, the vibration element units 147 and 148 together with the upper and lower bases 142 and 143 are driven linearly using the frictional force in the longitudinal direction of the friction member 141.

In the linear driving mechanism 140, a zoom lens holder 149 for holding a lens, for example, is coupled to the lower base 143 via a coupling member 150. A coupling mechanism for coupling the coupling member 150 with the lower base 143 consists of a pin 151 projecting downward from the lower base 143, and a pin groove 152 provided in the coupling member 150 into which the pin 151 is fitted, for example. To maintain the engagement of the pin 151 with the pin groove 152, a torsion spring 153 is disposed on the coupling member 150 to urge the coupling member 150 toward the leaver base 143.

In the upper base 142, the elastic force of the coil spring 146 produces a moment around the first shaft 144, and the moment causes the vibration element unit 147 to be pressed against the friction member 141. On the other hand, in the lower base 143, the elastic force of the coil spring 146 produces a moment around the second shaft 145, and the moment causes the vibration element unit 148 to be pressed against the friction member 141. As for the lower base 143, the urging force of the torsion spring 153 also produces a moment around the second shaft 145. The resultant moment around the second shaft 145 of the lower base 143 becomes greater than the moment around the first shaft 144 of the upper base 142. As a result, a pressing force of the vibration element unit 147, which is caused by the moment around the first shaft 144, becomes different from the pressing force of the vibration element unit 148, which is caused by the resultant moment around the second shaft 145. This means that the balance between the pressing force of the vibration element unit 147 and the pressing force of the vibration element unit 148 is not achieved. Difference between the pressing forces of the vibration element units 147 and 148 may cause one vibration element unit to hinder movement of the other vibration element unit. The difference may also cause one vibration element unit to wear taster than the other vibration element unit, which may shorten a service life of the linear driving mechanism 140.

SUMMARY OF THE INVENTION

The present invention provides a linear driving mechanism that can smoothly move a driven object and lengthen its service life, an image pickup apparatus, a lens barrel, and a stage moving apparatus.

Accordingly, the present invention provides a linear driving mechanism comprising a first vibration element and a second vibration element, the first and second vibration elements being disposed in touch with a friction member so that the friction member is sandwiched between the first and second vibration elements, a first holding member configured to hold the first vibration element, the first holding member being rotatably supported by a first shaft extending parallel to a movement direction of a moving body, a second holding member configured to hold the second vibration element, the second holding member being rotatably supported by a second shaft extending parallel to the movement direction, an urging part configured to move the first holding member around the first shaft to press the first vibration element against the friction member, and to move the second holding member around the second shaft to press the second vibration element against the friction member, a coupling member configured to couple the first holding member or the second holding member with a driven object, and a pressing part configured to press the coupling member against the moving body, wherein a direction of a pressing force of the pressing part intersects with the first shaft when the coupling member couples with the first holding member, and the direction of the pressing force of the pressing part intersects with the second shaft whew the coupling member couples with the second holding member.

According to the present invention, the linear driving mechanism can smoothly move a driven object and lengthen its service life.

Further features of the present invention will become apparent from the following description of exemplary embodiments (with reference to the attached drawings).

DESCRIPTION OF THE EMBODIMENTS

Embodiments of the present invention will now be described in detail with reference to the accompanying drawings. A first embodiment of the present invention will now be described.

Figure 1:
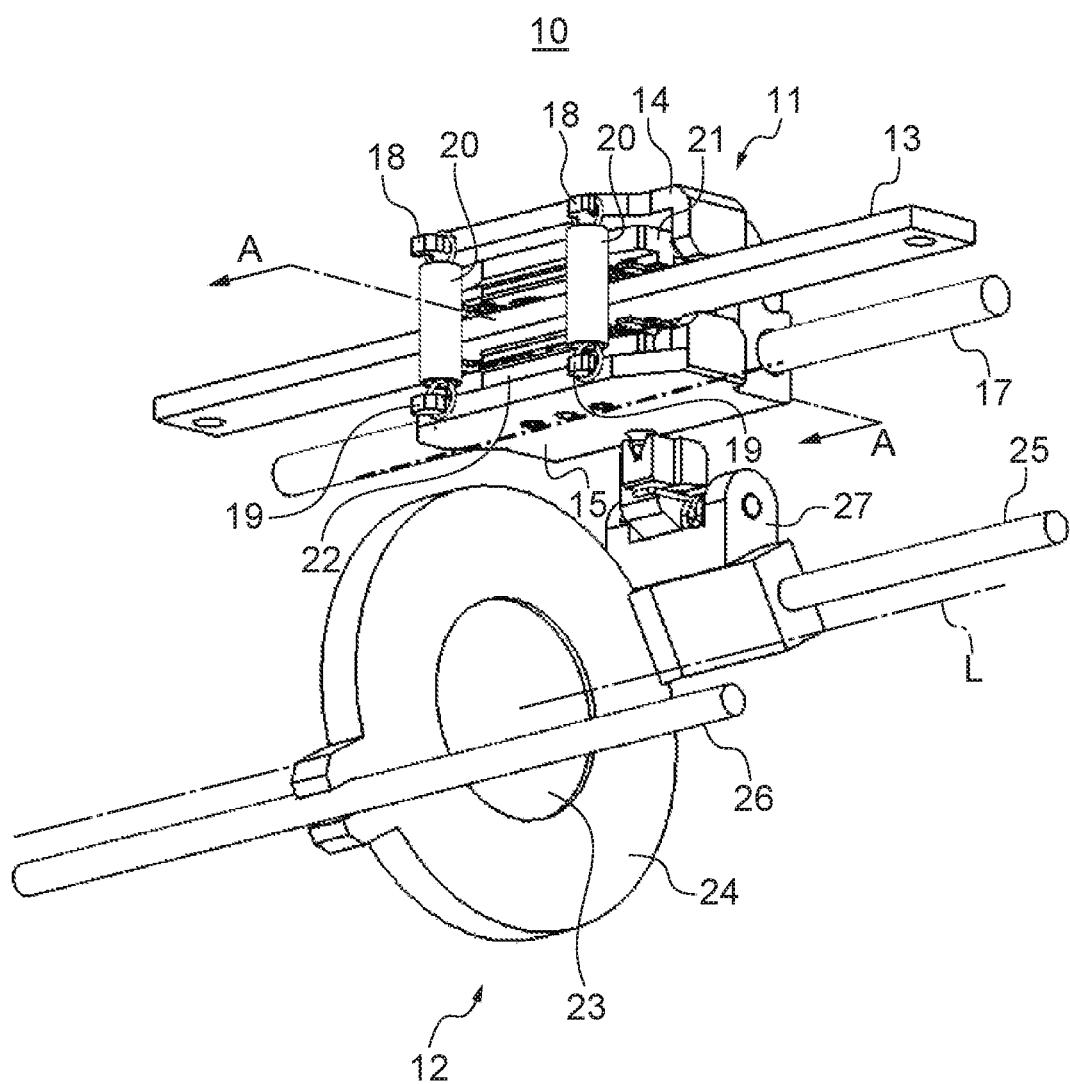
FIG. 1 is a perspective view schematically showing the internal structure of a lens barrel of an image pickup apparatus provided with a linear driving mechanism according to a first embodiment of the present invention.
Figure 2:
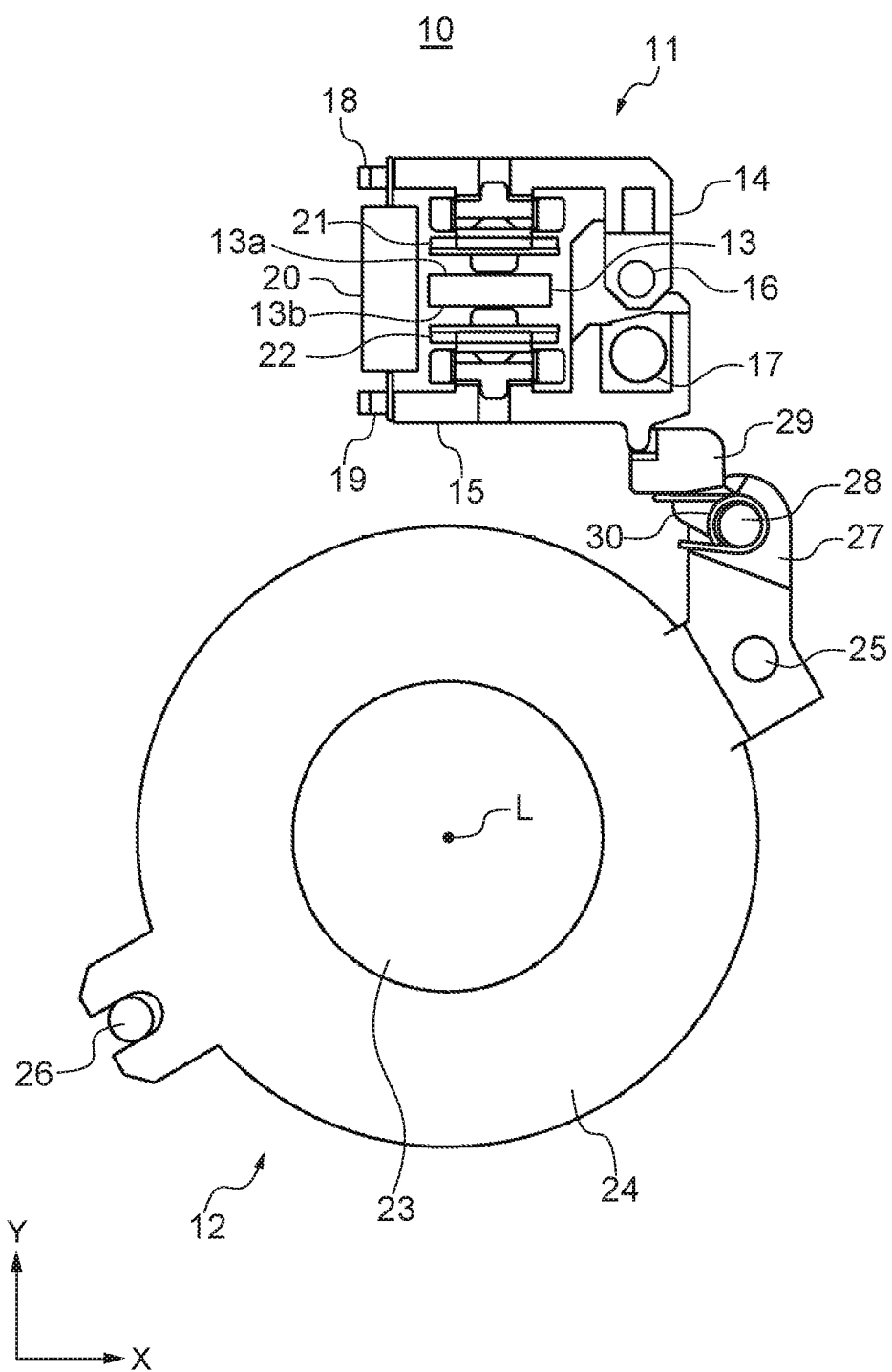
FIG. 2 is a cross-sectional view taken along the line A-A in FIG. 1.

FIG. 1 is a perspective view schematically showing the internal structure of a lens barrel of an image pickup apparatus (a camera) provided with a linear driving mechanism according to the present embodiment. FIG. 2 is a cross-sectional view taken along the line A-A in FIG. 1. It should be noted that FIGS. 1 and 2 only show a zoom lens, a zoom lens holder, and guiding shafts of a zoom lens unit which are elements of the internal structure of the lens barrel and do not show other components of the zoom lens unit and a housing for covering the linear driving mechanism.

As shown in FIGS. 1 and 2, a linear driving mechanism 10 includes a moving body unit 11 and a zoom lens unit 12 (a driven object). The moving body unit 11 includes an upper base 14 (a first holding member), a lower base 15 (a second holding member), and a friction member 13. The friction member 13 is an elongated thin plain plate with a rectangular cross-section, and is disposed along an optical axis L and sandwiched between the upper base 14 and the lower base 15. The upper base 14 is rotatably supported by a coupling shaft 16 (a first shaft) disposed parallel to an optical axis L (the movement direction), and the lower base 15 is rotatably supported by a guiding shaft 17 (a second shaft) disposed parallel to the optical axis L. The coupling shaft 16 is fitted into a fating hole in the upper base 14 and in another fitting hole in the lower base 15 to couple the upper and lower bases 14 and 15. The guiding shaft 17 is loosely fitted in a guiding hole in the lower base 15 and extends along the optical axis L. The guiding shaft 17 guides the moving body unit 11 along the optical axis L when the moving body unit 11 moves. A hook 18 as a hooking part is disposed on an edge in the side opposite to the side with the coupling shaft 16 of the upper base 14, and a hook 19 as a hooking part is disposed on an edge in the side opposite to the side with the guiding shaft J 7 of the lower base 15. To couple the upper and lower bases 14 and 15, a coil spring 20 (an urging part) is hooked on the hooks 18 and 19 in the direction orthogonal to an upper contact surface 13a and a lower contact surface 13b of the friction member 13 (this direction is simply referred to as "the vertical direction" hereinafter) (in the direction Y in FIG. 2). The coil spring 20 pulls rotationally the upper base 14 and the tower base 15 with an elastic force (an urging force) to move the upper base 14 around the coupling shaft 16 and the lower base 15 around the guiding shaft 17 so that the upper and lower bases 14 and 15 come close to each other. An upper vibration element unit 21 (a first vibration element) is disposed between the upper base 14 and the friction member 13, and a lower vibration element unit 22 (a second vibration element) is disposed between the lower base 15 and the friction member 13. The upper base 14 holds the upper vibration element unit 21 and the movement of the upper base 14 around the coupling shaft 16 causes the upper vibration element unit 21 to be pressed against the upper contact surface 13a of the friction member 13. The lower base 15 holds the lower vibration element unit 22 and the movement of the lower base 15 around the guiding shaft 17 causes the lower vibration element unit 22 to be pressed against the lower contact surface 13b of the friction member 13. As described below, when the upper and lower vibration element units 21 and 22 generate ultrasonic vibrations to generate frictional force with fee friction member 13, the upper and Lower vibration element units 21 and 22 together with the upper and lower bases 14 and 15 are driven linearly using the frictional force along the optical axis L.

A zoom lens unit 12 includes a generally annular zoom lens holder 24 for holding a zoom lens 23 (an optical member) disposed on the optical axis L. The zoom lens holder 24 is engaged with two guiding shafts 25 and 26 (guiding members) disposed parallel to the optical axis L. The guiding shafts 25 and 26 guide the zoom lens holder 24 along the optical axis L when the zoom lens holder 24 moves. The zoom lens holder 24 includes a coupling base 27. The coupling base 27 is near the moving body unit 11 and projects toward the moving body unit 11. The coupling base 27 supports a coupling member 29 so that the coupling member 29 can move around a coupling shaft 28 disposed parallel to the optical axis L. The coupling base 27 includes a torsion spring 30 (a pressing part) wound around the coupling shaft 28. The torsion spring 30 presses the coupling member 29 upward. In the linear driving mechanism 10, as described below with reference to FIG. 3, the lower base 15 has a protrusion 31 projecting downward and the coupling member 29 has a recess 32 open upward. The torsion spring 30 presses the coupling member 29 upward to fit the protrusion 31 into the recess 32.

Figure 3:
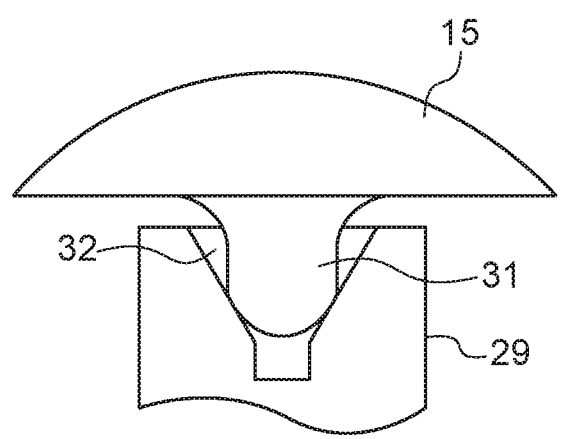
FIG. 3 is an enlarged cross-sectional view showing engagement status of a protrusion of a lower base with a recess in a coupling member.

FIG. 3 is an enlarged cross-sectional view showing an engagement status of the protrusion of the lower base with the recess in the coupling member. As shown in FIG. 3, the recess 32 has an inverted-triangle cross-section flaring upward, that is, the recess 32 sharpens downwardly in a direction in which the torsion spring 30 presses the coupling member 29. With this arrangement, the protrusion 31 is engaged stably with the recess 32. In the linear driving mechanism 10, the torsion spring 30 keeps the protrusion 31 engaged with the recess 32 all the time, so that the zoom lens unit 12 is driven by the moving body unit 11 towing the zoom lens unit 12 when the moving body unit 11 moves.

Figure 4:
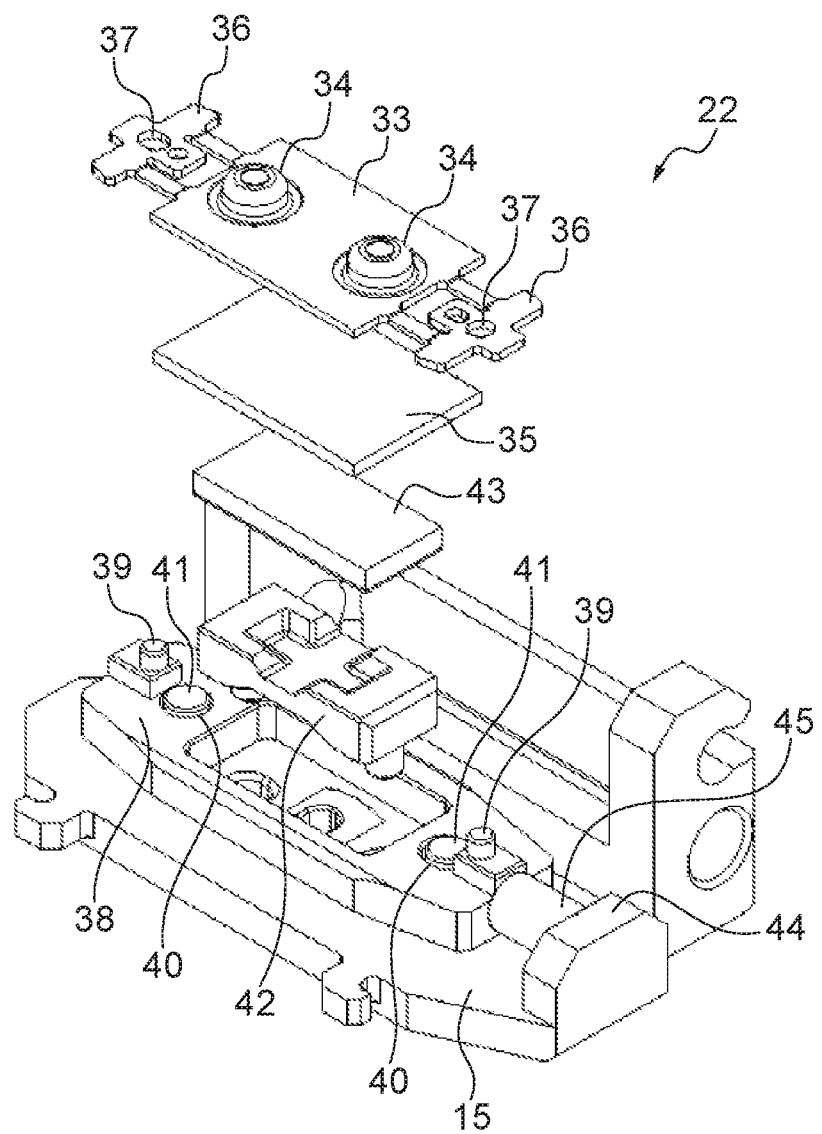
FIG. 4 is an exploded perspective view schematically showing a structure of a lower vibration element unit.

FIG. 4 is an exploded perspective view schematically showing a structure of the lower vibration element unit. As shown in FIG. 4, the lower vibration element unit 22 includes a vibration plate 33, two protrusions 34 on an upper surface of the vibration plate 33 (this surface is referred to as "a contact surface" hereinafter), and a piezoelectric element 35 as an electro-mechanical energy converting element on a surface opposite to the contact surface. The vibration plate 33 is a rectangular plate member made of a metal material such as SUS420J2. Each protrusion 34 is formed in a shape having spring property and Is integrated with a plate member constituting the vibration plate 33 by press working, for example. It should be noted that the protrusions 34 are not necessarily integrated with the vibration plate 33. Alternatively, the protrusions 34 may be prepared separately other than the vibration plate 33 and be fixed to the vibration plate 33 by welding, for example. The number of the protrusions 34 is not limited to two, however, at least one protrusion 34 needs to be provided on the contact surface. In the lower vibration element unit 22, as described below, tips of the protrusions 34 generate frictional force with the lower contact surface 13b of the friction member 13 to be driven linearly using the frictional force. The tips of the protrusions 34 should preferably be hardened by quenching, for example, to enhance their wear resistance. The vibration plate 33 includes a fixing part 36 on each longitudinal end, and each fixing part 36 has a pin hole 37.

The lower vibration element unit 22 is supported by a supporting member 38. The supporting member 38 is comprised of an elongated plate member and includes a cylindrical positioning pin 39 projecting upward near each longitudinal end. When the supporting member 38 supports the lower vibration element unit 22, each positioning pin 39 is inserted into the pin hole 37 in the corresponding fixing part 36. The lower vibration element unit 22 is disposed in place on the supporting member 38 in this manner. Each fixing part 36 is then fixed to the supporting member 38 by using adhesive or welding. The supporting member 38 is mounted on the lower base 15. The supporting member 38 has two through-holes 40 and the lower base 15 has two positioning pins 41 projecting upward, and each positioning pin 41 is inserted into the corresponding through-hole 40. The supporting member 38 is disposed in place on the lower base 15 in this manner. The diameter of the through-hole 40 is larger than the diameter of the positioning pin 41, so that the supporting member 38 can move vertically in a direction in which the positioning pins 41 protrude.

A piezoelectric element 35, which converts electrical energy to mechanical energy, is fixed to the vibration plate 33 with adhesive. The piezoelectric element 35 is comprised of a rectangular piezo-ceramic plate with an electrode having a predetermined shape on each surface. The electrodes of the piezoelectric element 35 are supplied with a driving voltage (an alternating voltage) having a predetermined frequency via a flexible wiring board (not shown) or the like. This power supply causes the lower vibration element unit 22 to generate vibrations in a mode A and vibrations in a mode B as described below. The generated vibrations are transmitted to the vibration plate 33. On a plane defined by the line between the two protrusions 34 (in the direction of the optical axis L) and the direction in which the protrusions 34 project the tips of the protrusions 34 move in an elliptic manner.

The lower vibration element unit 22, which is mounted on the lower base 15, is pressed against the lower contact surface 13b of the friction member 13 by the movement of the lower base 15 around the guiding shaft 17. Specifically, the tips of the protrusions 34 are pressed against the lower contact surface 13b of the friction member 13. The elliptic motion of the protrusions 34 generates frictional force between the lower vibration element unit 22 and the friction member 13. Due to the frictional force, the lower vibration element unit 22 can be driven linearly in the direction of the optical axis L relative to the friction member 13. In the linear driving mechanism 10, however, the friction member 13 is fixed in place to the lens barrel body or the like and does not move in the direction of the optical axis L. As a result, only the lower vibration element unit 22 moves in the direction of the optical axis L.

In the lower vibration element unit 22, the supporting member 38 has a rectangular opening generally in the center thereof, and the opening accommodates a pressing member 42 and a vibration insulating member 43. This means that the lower base 15 presses the lower vibration element unit 22 (the piezoelectric element 35) via the pressing member 42 and the vibration insulating member 43. The vibration insulating member 43 is made of an elastic member such as felt, synthetic, leather, rubber, and moltplane, and prevents the lower base 15 from damping the vibrations generated by the piezoelectric element 35. The vibration insulating member 43 enables efficient transmission of the vibrations generated by the piezoelectric element 35 to the vibration plate 33, which enhances the elliptic motion of the protrusions 34. By fixing the vibration insulating member 43 to the pressing member 42, the vibration insulating member 43 can be pressed against the piezoelectric element 35 more stably. Alternatively, the vibration insulating member 43 may be fixed to the piezoelectric element 35.

The lower base 15 includes a rib 44 projecting upward at an end, and a spring 45 is disposed between the rib 44 and the supporting member 38. The spring 45 urges the supporting member 38 in a direction opposite to the rib 44. The elastic force of the spring 45 causes at least one of the positioning pins 41 to be pressed against a part of an inner wall of each of the through-holes 40 in the supporting member 38, which stabilizes a position of the supporting member 38 on the lower base 15. The upper vibration element unit 21 has a similar structure to the structure of the lower vibration element unit 22. The description of the structure of the upper vibration element unit 21 will be omitted for avoiding redundancy.

Figure 5:
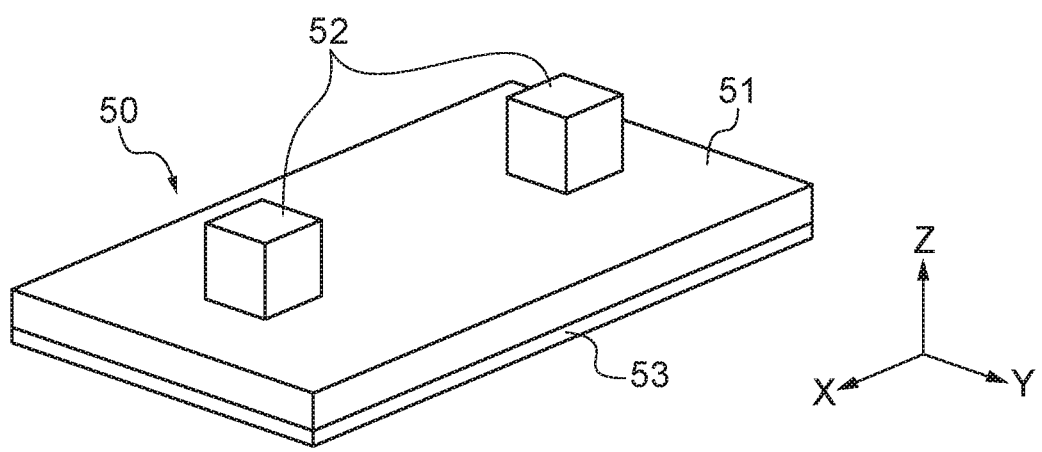
FIG. 5 is a perspective view of a vibration body indicated by simplifying an arrangement of the lower vibration element unit.

Principal driving mechanism for the upper and lower vibration element units 21 and 22 will now be described. The above principal driving mechanism will be described in detailed by referring to FIG. 5 in which a structure of the lower vibration element unit 22 is simplified. As shown in FIG. 5, a vibration body 50 includes a vibration plate 51, two protrusions 52 on the upper surface of the vibration plate 51, and a piezoelectric element 53 as an electro-mechanical energy converting element on the lower surface of the vibration plate 51.

Figure 6A:
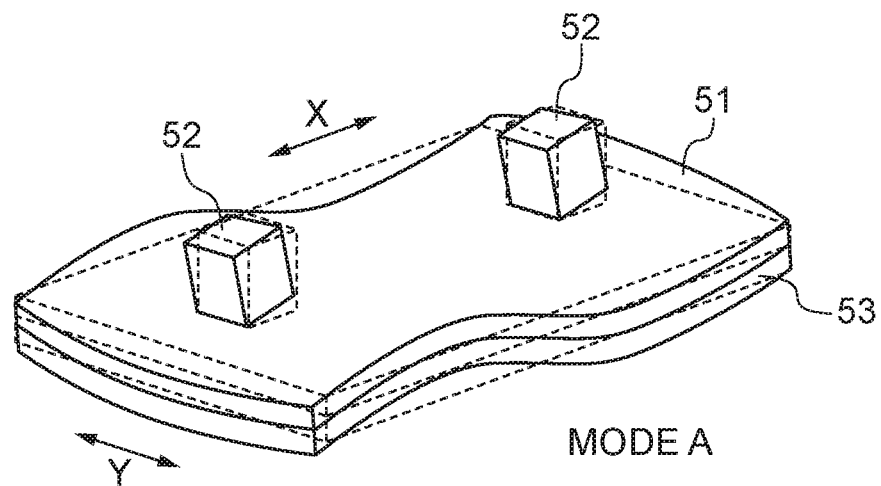
FIGS. 6A and 6B are perspective views useful for explaining respective vibration modes generated in the vibration body in FIG. 5.
Figure 6B:
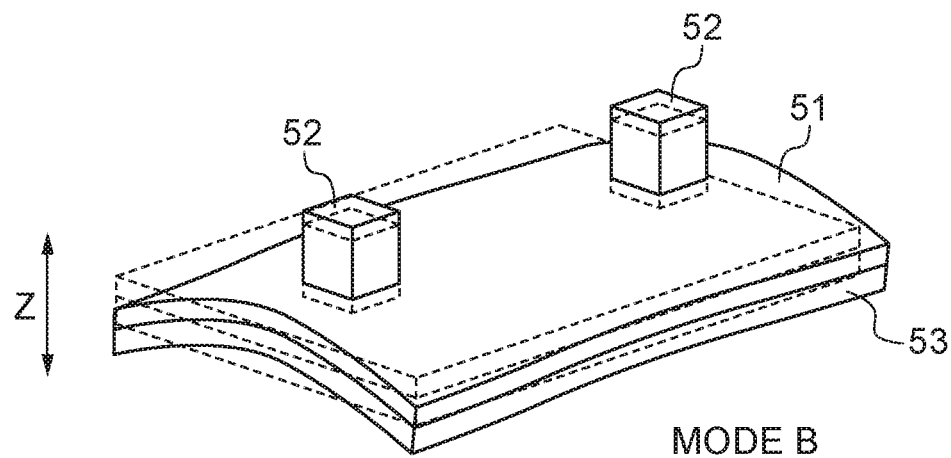

FIGS. 6A and 6B are perspective views useful for explaining two respective vibration modes generated in the vibration body in FIG. 5. FIG. 6A shows a vibration mode A and FIG. 6B shows a vibration mode B. It should be noted that displacements are exaggerated for better understanding in FIGS. 6A and 6B. In the vibration mode A, the vibration body 50 produces a vibration pattern having two curves in the direction X in the drawing and having three node lines generally parallel to the direction Y in the drawing. In this mode A, the protrusions 52 reciprocate repeatedly in the direction X. By placing each protrusion 52 near one of the node lines, reciprocal displacement in the direction X of the protrusion 52 can be maximized in the mode A. In the vibration mode B, the vibration body 50 produces a vibration pattern having one curve in the direction Y and two node lines generally parallel to the direction X. In this mode B, the protrusions 52 reciprocate repeatedly in the direction Z in the drawing. By placing each protrusion 52 near an antinode line between the two node lines, reciprocal displacement in the direction Z of the protrusion 52 can be maximized in the mode B. The vibration body 50 produces a combined vibration pattern of combines the vibration pattern in the mode A and the vibration pattern in the mode B so as to produce an elliptic motion of tips of the protrusions 52 generally in a plane defined by the directions X and Z. The elliptic motion generates frictional force to drive the friction member 13 generally in the direction X.

The linear driving mechanism 10 also includes a controller (not shown). The controller controls the vibration of the upper and lower vibration element units 21 and 22 to control the movement of the upper and lower vibration element units 21 and 22 and thus the movement of the moving body unit 11. By controlling the movement of the moving body unit 11, the controller controls the movement of the zoom lens unit 12 coupled to the moving body unit 11 and moves the zoom lens 23 and the zoom lens holder 24 to a predetermined position.

In the upper base 14 of the linear driving mechanism 10, the elastic force of the coil spring 20 produces a moment around the coupling shaft 16, and the moment causes the upper vibration element unit 21 to be pressed against the friction member 13. In the lower base 15, the elastic force of the coil spring 20 produces a moment around the guiding shaft 17, and the moment causes the lower vibration element unit 22 to be pressed against the friction member 13. As for the lower base 15, the pressing force of the torsion spring 30 may also produce a moment around the guiding shaft 17. When the pressing force of the torsion spring 30 produces the moment, the resultant moment around the guiding shaft 17 of the lower base 15 becomes greater than the moment around the coupling shaft 16 of the upper base 14. As a result, a pressing force of the lower vibration element unit 22, which is produced by the resultant moment around the guiding shaft 17, becomes greater than a pressing force of the upper vibration element unit 21, which is produced by the moment around the coupling shaft 16. This means that the balance between the pressing force of the upper vibration element unit 21 and the pressing force of the lower vibration element unit 22 is not achieved. Difference between the pressing forces of the upper and lower vibration element units 21 and 22 may cause the lower vibration element unit 22 to hinder movement of the upper vibration element unit 21, for example. The difference may also cause the lower vibration element unit 22 to wear faster than the upper vibration element unit 21, which may shorten a service life of the linear driving mechanism 10. To solve these problems, the present embodiment includes a balancing structure for achieving a balance between the pressing force of the upper vibration element unit 21 and the pressing force of the lower vibration element unit 22.

Figure 7:
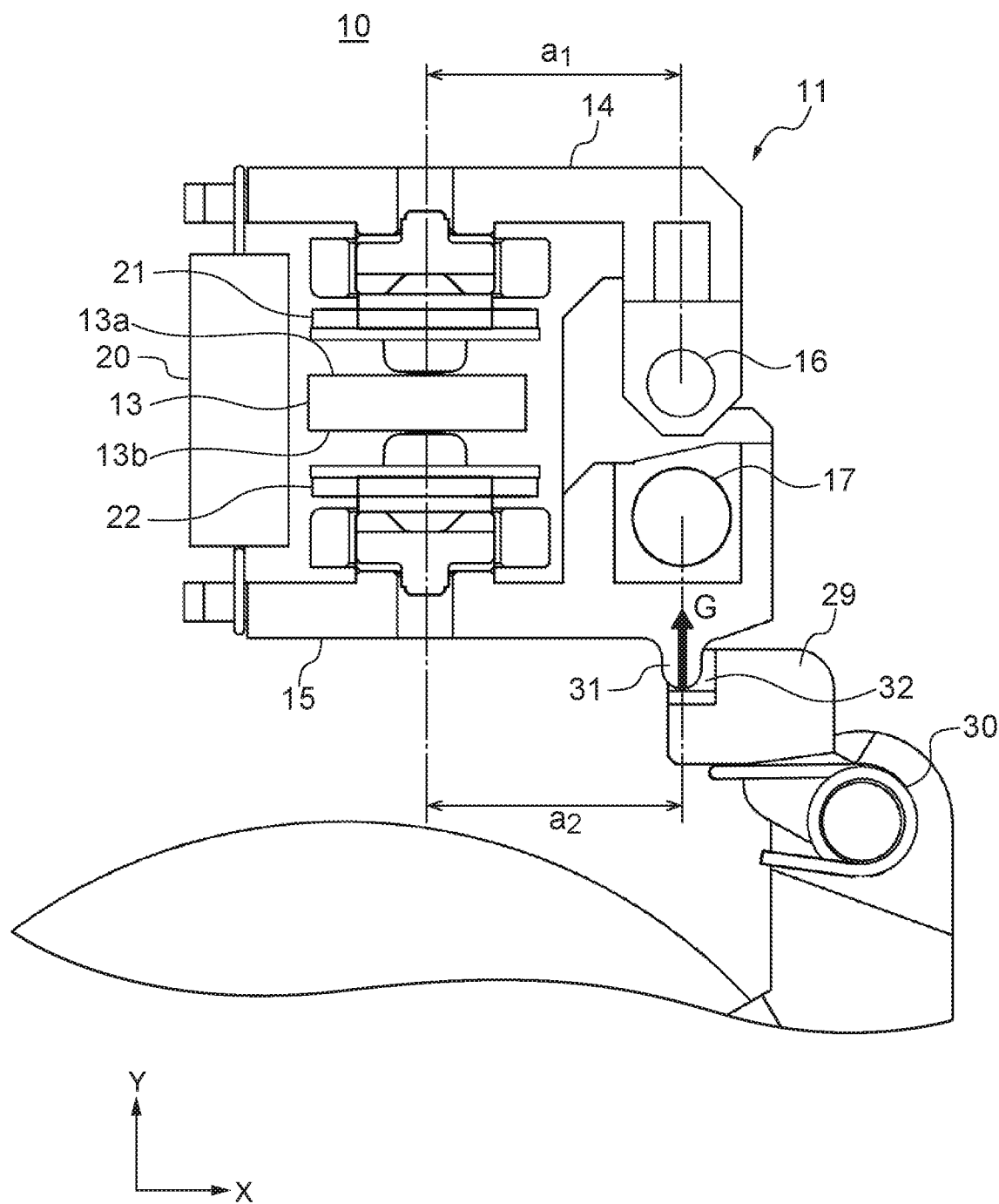
FIG. 7 is an enlarged cross-sectional view showing a balancing structure for achieving a balance between pressing forces of respective vibration element units in the first embodiment of the present invention.

FIG. 7 is an enlarged cross-sectional view showing a balancing structure for achieving a balance between pressing forces of respective vibration element units in the present embodiment. Since the details of the structures of the moving body unit 11 and the zoom lens unit 12 have already been described above, only structural elements necessary for explanation will now be described with reference numerals. As shown in FIG. 7, a distance $a_1$ is a distance between the center of the coupling shaft 16 and a contact point of the upper vibration element unit 21 with the upper contact surface 13a of the friction member 13 in a direction parallel to the upper contact surface 13a. A distance $a_2$ is a distance between the center of the guiding shaft 17 and a contact point of the lower vibration element unit 22 with the lower contact surface 13b of the friction member 13 in a direction parallel to the lower contact surface 13b. Both the direction parallel to the upper contact surface 13a of the friction member 13 and the direction parallel to the lower contact surface 13b of the friction member 13 are in the direction X in the drawing.

In the linear driving mechanism 10, as shown in FIG. 7, the protrusion 31 is engaged with the recess 32 right under the guiding shaft 17. This position where the protrusion 31 is engaged with the recess 32 is called an engagement position (a pressing position) hereinafter. Specifically, the engagement position of the protrusion 31 and the recess 32 is aligned with the center of the guiding shaft 17 in the direction X in the drawing. In this configuration, a pressing force G of the torsion spring 30 is transmitted to the lower base 15 via the coupling member 29, and the direction of the pressing force G is directed to the center of the guiding shaft 17 to intersect with the center of the guiding shaft 17. Under the circumstances, the pressing force of the torsion spring 30 produces no moment. In this configuration, both the moment around the coupling shaft 16 of the upper base 14 and the moment around the guiding shaft 17 of the lower base 15 are produced only by the elastic force of the coil spring 20. This means that an amount of the moment around the guiding shaft 17 of the lower base 15 is equal to that of the moment around the coupling shaft 16 of the upper base 14. When the upper base 14 is assumed to be a lever, the distance $a_1$ corresponds to a distance between a fulcrum and a point of application. When the lower base 15 is assumed to be a lever, the distance $a_2$ corresponds to a distance between a fulcrum and a point of application. In the linear driving mechanism 10, the distance $a_1$ is set to be equal to the distance $a_2$. Therefore, an amount of the pressing force of the lower vibration element unit 22, which is produced by the moment around the guiding shaft 17, is equal to that of the pressing force of the upper vibration element unit 21, which is produced by the moment around the coupling shaft 16. As a result, the movement of the upper vibration element unit 21 or the lower vibration element unit 22 is not hindered. In addition, the upper vibration element unit 21 wears at the same rate as the lower vibration element unit 22. Accordingly, the linear driving mechanism 10 of the present embodiment can smoothly move the moving body unit 11 and thus the zoom lens unit 12 and lengthen its service life.

It should be noted that the direction of the pressing force G of the torsion spring 30 does not necessarily intersect exactly with the center of the guiding shaft 17. It is not necessary for the direction of the pressing force G to cross the center of the guiding shaft 17 as long as the moment around the guiding shaft 17 due to the pressing force G is negligibly small. Specifically, the direction of the pressing force G only needs to be directed to the guiding shaft 17 to intersect with a section of the guiding shaft 17 so that a vector of the pressing force G penetrates the guiding shaft 17. In addition, the direction of the pressing force G does not necessarily intersect with the guiding shaft 17 at right angles.

A second embodiment of the present invention will now be described. The second embodiment has basically the same structures and functions as the structures and functions of the first embodiment described above. To avoid the redundant description of the same structures and functions, only different structures and functions will now be described. In the first embodiment described above, the coupling member 29 is coupled to the lower base 15. In the second embodiment, the coupling member 29 is coupled to the upper base 14, which is different from the first embodiment.

Figure 8:
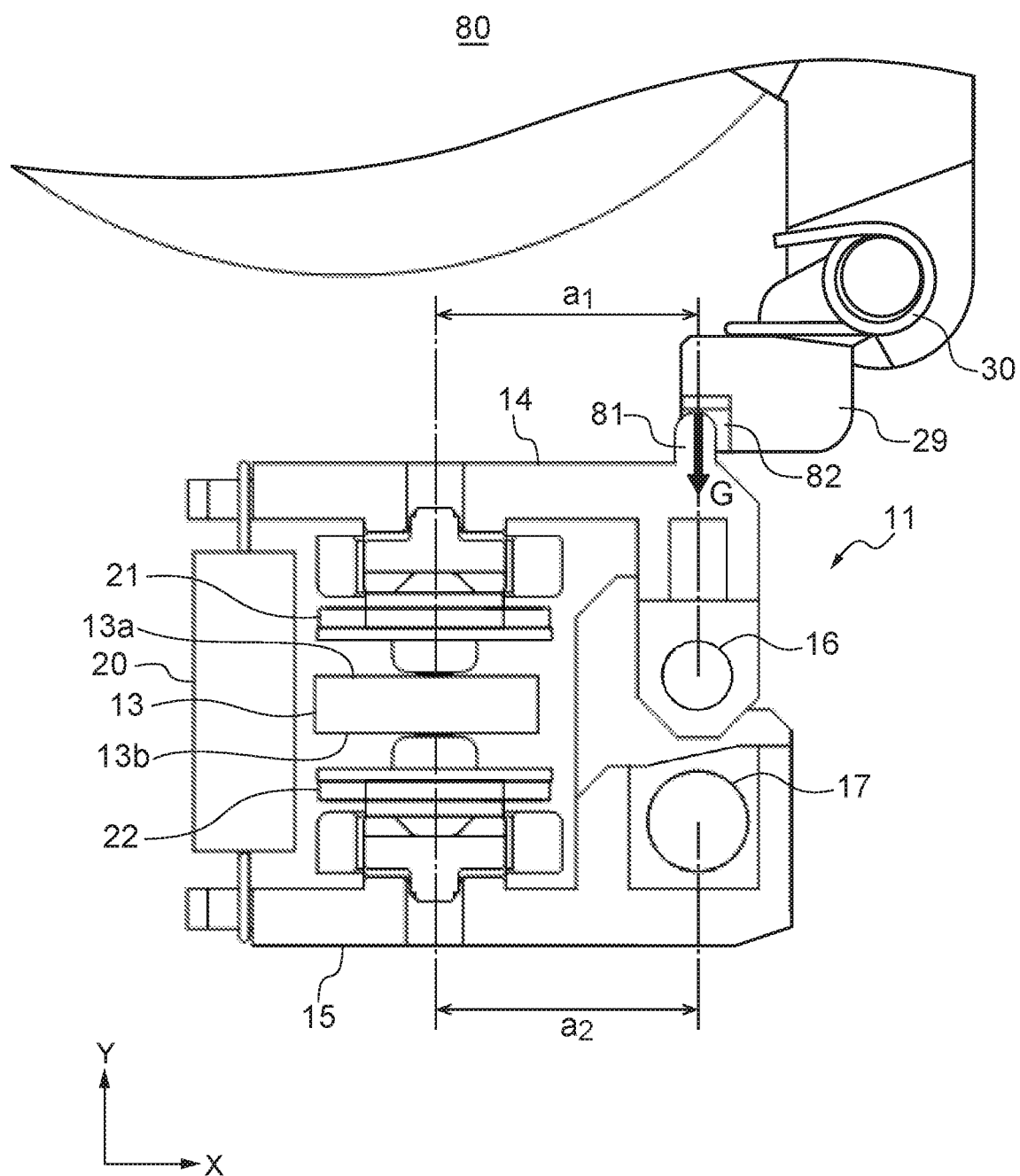
FIG. 8 is an enlarged cross-sectional view showing a balancing structure for achieving a balance between pressing forces of respective vibration element units in a second embodiment of the present invention.

FIG. 8 is an enlarged cross-sectional view showing a balancing structure for achieving a balance between pressing forces of respective vibration element units in the present embodiment. In a linear driving mechanism 80 Of the present embodiment, the upper base 14 has a protrusion 81 projecting upward and the coupling member 29 has a recess 82 open downward. The torsion spring 30 presses the coupling member 29 downward to fit the protrusion 81 into the recess 82. The protrusion 81 has the same shape as the shape of the protrusion 31, and the recess 82 has the same shape as the shape of the recess 32.

In the linear driving mechanism 80, as shown in FIG. 8, an engagement position of the protrusion 81 and the recess 82 is disposed right over the coupling shaft 16. Specifically, the engagement position of the protrusion 81 and the recess 82 is aligned with the center of the coupling shaft 16 in the direction X in the drawing. In this configuration, the pressing force G of the torsion spring 30 is transmitted to the upper base 14 via the coupling member 29. The direction of the pressing force G is directed to the center of the coupling shaft 16 to intersect with the center of the coupling shaft 16. Under the circumstances, the pressing force of the torsion spring 30 produces no moment. In this configuration, both the moment around the guiding shaft 17 of the lower base 15 and the moment around the coupling shaft 16 of the upper base 14 are produced only by the elastic force of the coil spring 20. This means that the moment around the coupling shaft 16 of the tipper base 14 is equal to the moment around the guiding shaft 17 of the lower base 15. Also in the linear driving mechanism 80, the distance $a_1$ is set to be equal to the distance $a_2$. Therefore, m amount of the pressing force of the upper vibration element unit 21, which is produced by the moment around the coupling shaft 16, is equal to that of the pressing force of the lower vibration element unit 22, which is produced by the moment around the guiding shaft 17.

It should be noted that the direction of the pressing force G of the torsion spring 30 does not necessarily intersect exactly with the center of the coupling shaft 16. It is not necessary for the direction of the pressing force G to cross the center of the guiding shaft 17 as long as the moment around the coupling shaft 16 due to the pressing force G is negligibly small. Specifically, the direction of the pressing force G only needs to be directed to the coupling shaft 16 to intersect with a section of the coupling shaft 16 so that a vector of the pressing force G penetrates the coupling shaft 16. In addition, the direction of the pressing force G does not necessarily intersect with the coupling shaft 16 at right angles.

A third embodiment of the present invention will now be described. The third embodiment has basically the same structures and functions as the structures and functions of the first embodiment described above. To avoid the redundant description of the same structures and functions, only different structures and functions will now be described. In the first embodiment described above, the engagement position of the protrusion 31 and the recess 32 is disposed right under the guiding shaft 17. In the third embodiment, the engagement position of the protrusion 31 and the recess 32 is not disposed right under the guiding shaft 17, which is different from the first embodiment.

Figure 9:
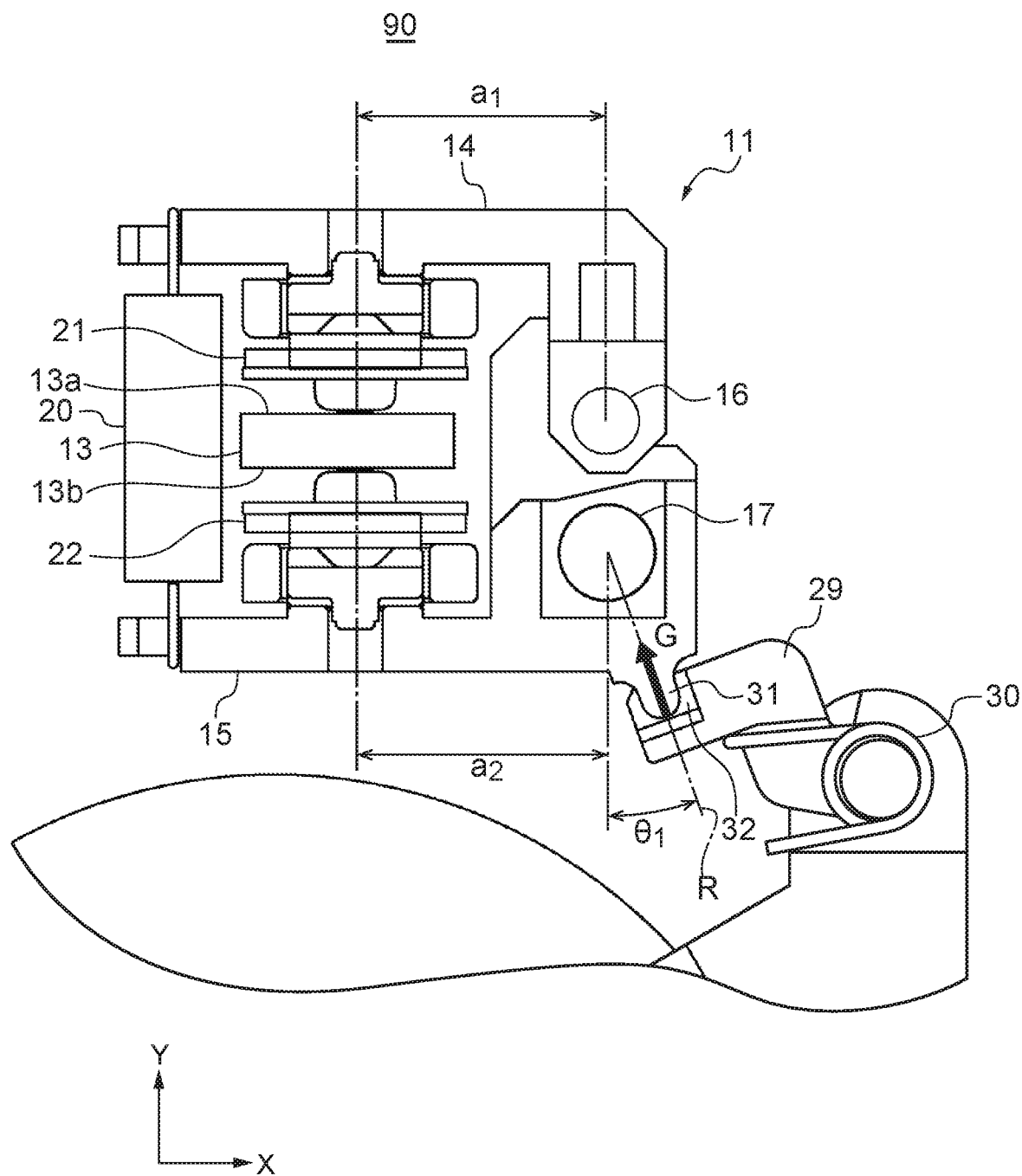
FIG. 9 is an enlarged cross-sectional view showing a balancing structure for achieving a balance between pressing forces of respective vibration element units in a third embodiment of the present invention.

FIG. 9 is an enlarged cross-sectional view showing a balancing structure for achieving a balance between pressing forces of respective vibration element units in the present embodiment. In a linear driving mechanism 90, as shown in FIG. 9, the engagement position of the protrusion 31 and the recess 32 is not disposed right under the guiding shaft 17 but is disposed at a rotation angle $\theta_1$ with the vertical line extending downward from the center of the guiding shaft 17 around the center of the guiding shaft 17. Specifically, the protrusion 31 is formed to protrude along an axis R intersecting with the center of the guiding shaft 17 and extending at the rotation angle $\theta_1$. The recess 32 has an inverted-triangle cross-section Oaring upward, that is, the recess 32 sharpens downwardly along the axis R. The pressing force G of the torsion spring 30 is transmitted to the lower base 15 via the coupling member 29 along the axis R, so that the direction of the pressing force G is directed to the confer of the guiding shaft 17 to intersect with the center of the guiding shaft 17. Under the circumstances, the pressing force of the torsion spring 30 produces no moment. In this configuration, both the moment around the coupling shaft 16 of the upper base 14 and the moment around the guiding shaft 17 of the lower base 15 are produced only by the elastic force of the coil spring 20. This means that the moment around the guiding shaft 17 of the lower base 15 is equal to the moment around the coupling shaft 16 of the upper base 14. Also in the linear driving mechanism 90, the distance $a_1$ is set to be equal to the distance $a_2$. Therefore, an amount of the pressing force of the upper vibration element unit 21, which is produced by the moment around the coupling shaft 16, is equal to that of the pressing force of the lower vibration element unit 22, which is produced by the moment around the guiding shaft 17.

It should be noted that the direction of the pressing force G of the torsion spring 30 does not necessarily intersect exactly with the center of the guiding shaft 17. It is not necessary for the direction of the pressing force G to cross the center of the guiding shaft 17 as long as the moment around the guiding shaft 17 due to the pressing force G is negligibly small. Specifically, the direction of the pressing force G only needs to be directed to the guiding shaft 17 to intersect with a section of the guiding shaft 17 so that a vector of the pressing force G penetrates the guiding shaft 17. In addition, the direction of the pressing force G does not necessarily intersect with the guiding shaft 17 at right angles.

When the coupling member 29 is coupled to the upper base 14 in the linear driving mechanism 90, the engagement position of the protrusion 81 and the recess 82 is not disposed right over the coupling shaft 16 but is disposed at a predetermined rotation angle with the vertical line extending upward from the center of the coupling shaft 16 around the center of the coupling shaft 16. Specifically, the protrusion 81 is formed to protrude along an axis intersecting with the center of the coup ling shaft 16 and extending at the predetermined rotation angle. The recess 82 has an inverted-triangle cross-section flaring downward, that is, the recess 82 sharpens upwardly along the axis. The pressing force G of the torsion spring 30 is transmitted to the upper base 14 via the coupling member 29 along the axis, so that the direction of the pressing force G is directed to the center of the coupling shaft 16 to intersect with the center of the coupling shaft 16. Under the circumstances, the pressing force of the torsion spring 30 produces no moment.

It should be noted that the direction of the pressing force G of the torsion spring 30 does not necessarily intersect exactly with the center of the coupling shaft 16. It is not necessary for the direction of the pressing force G to cross the center of the coupling shaft 16 as long as the moment around the coupling shaft 16 due to the pressing force G is negligibly small. Specifically, the direction of the pressing force G only needs to be directed to the coupling shaft 16 to intersect with a section of the coupling shaft 16 so that a vector of the pressing force G penetrates the coupling shaft 16. In addition, the direction of the pressing force G does not necessarily intersect with the coupling shaft 16 at right angles.

A fourth embodiment of the present invention will now be described. The fourth embodiment has basically the same structures and functions as the structures and functions of the first embodiment described above. To avoid the redundant description of the same structures and functions, only different structures and functions will now be described. In the first embodiment described above, the engagement position of the protrusion 31 and the recess 32 is disposed right under the guiding shaft 17. In the fourth embodiment, the engagement position of the protrusion 31 and the recess 32 is not disposed right under the guiding shaft 17, which is the same as the third embodiment and different from the first embodiment. In the third embodiment, the distance $a_1$ is set to be equal to the distance $a_2$. In the fourth embodiment, the distance $a_1$ is set to be different from the distance $a_2$, which is different from the third embodiment.

Figure 10:
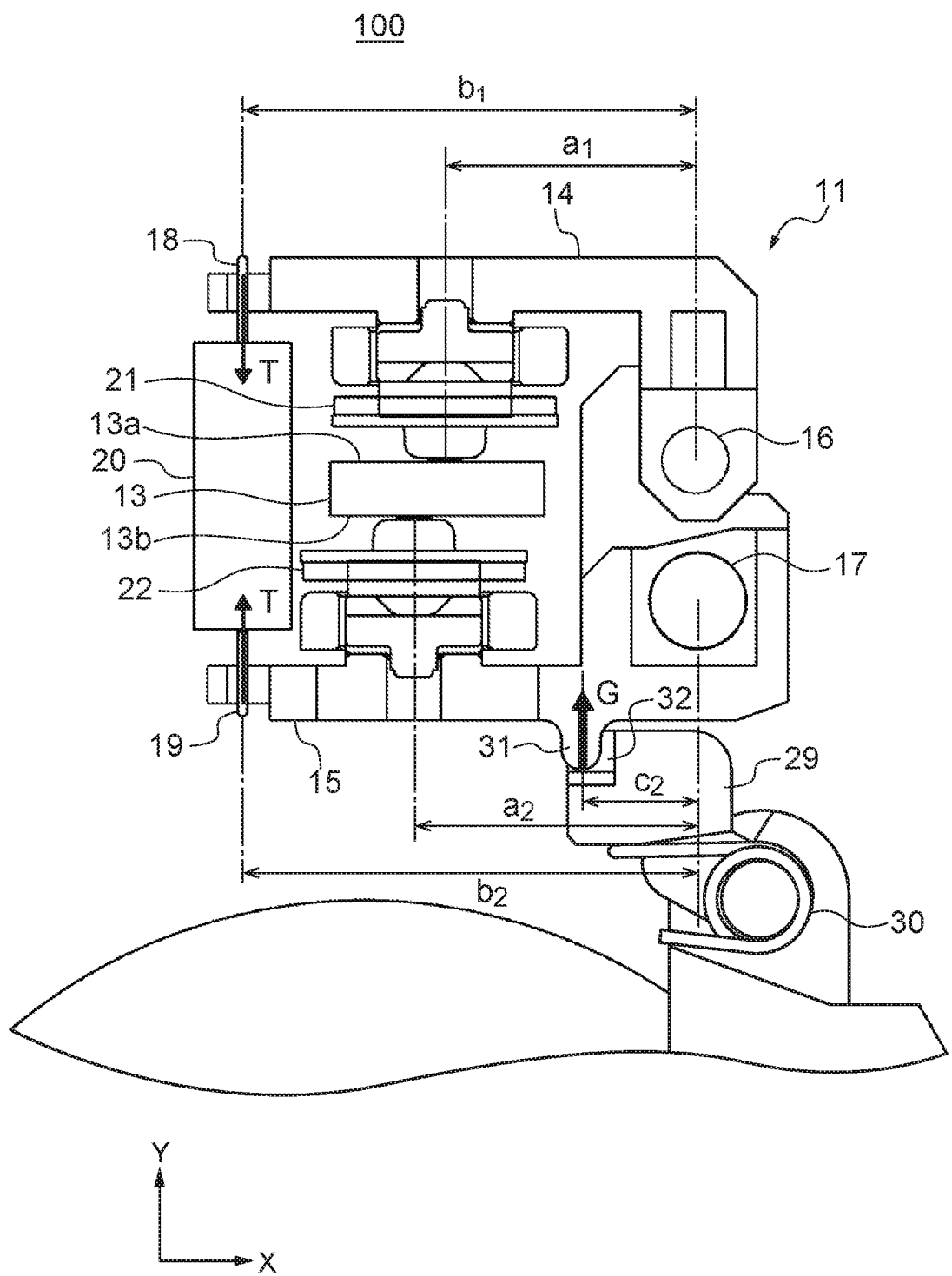
FIG. 10 is an enlarged cross-sectional view showing a balancing structure for achieving a balance between pressing forces of respective vibration element units in a fourth embodiment of the present invention.

FIG. 10 is an enlarged cross-sectional view showing a balancing structure for achieving a balance between pressing forces of respective vibration element units in the present embodiment. As shown in FIG. 10, the coupling member 29 is coupled to the lower base 15, and a distance $c_2$ is a distance between the guiding shaft 17 and the engagement position of the protrusion 31 and the recess 32 in the direction parallel to the lower contact surface 13b of the friction member 13. A distance $b_1$ is a distance between the coupling shaft 16 and an engagement position of the coil spring 20 and the upper base 14 (the position of the hook 18) in the direction parallel to the upper contact surface 13a of the friction member 13. A distance $b_2$ is a distance between the guiding shaft 17 and an engagement position of the coil spring 20 and the lower base 15 (the position of the hook 19) in the direction parallel to the lower contact surface 13b. Both the direction parallel to the upper contact surface 13a of the friction member 13 and the direction parallel to the lower contact surface 13b of the friction member 13 are in the direction X in the drawing.

In a linear driving mechanism 100, as shown in FIG. 10, the engagement position of the protrusion 31 and the recess 32 is not disposed right under the guiding shaft 17. In this configuration, the pressing force G of the torsion spring 30 is transmitted to the lower base via the coupling member 29, and the direction of the pressing force G is not directed to the center of the guiding shaft 17 and does not intersect with the center of the guiding shaft 17. Under the circumstances, the pressing force G of the torsion spring 30 produces a moment around the guiding shaft 17. This means that the resultant moment around the guiding shaft 17 of the lower base 15 becomes greater than the moment around the coupling shaft 16 of the upper base 14. In the principle of a lever, a pressing force at a point of application can be varied by changing a distance from a fulcrum to a point of application or a point where force is applied while keeping an amount of a moment around the fulcrum at the same value. Considering this principle of a lever, the distance $a_1$ is set to be different from the distance $a_2$ in the present embodiment. Specifically, the distance $a_2$ is set to be longer than the distance $a_1$, in a case where the distance $a_1$ corresponds to a distance between a fulcrum and a point of application when the upper base 14 is assumed to be a lever and the distance $a_2$ corresponds to a distance between a fulcrum and a point of application when the lower base 15 is assumed to be a lever. The distance $b_1$ corresponds to a distance between a fulcrum and a point where force is applied when the upper base 14 is assumed to be a lever. The distance $b_2$ corresponds to a distance between a fulcrum and a point where force is applied when the lower base 15 is assumed to be a lever. In the linear driving mechanism 100, the distance $b_1$ is set to be equal to the distance $b_2$. This configuration reduces the pressing force of the lower vibration element unit 22, which is produced by the resultant moment around the guiding shaft 17 of the lower base 15, and achieves a balance between the pressing force of the lower vibration element unit 22 and the pressing force of the upper vibration element unit 21, which is produced by the moment around the coupling shaft 16 of the upper base 14.

In this embodiment, a force $F_1$ is a pressing force of the upper vibration element unit 21 that is produced by the moment around the coupling shaft 16 due to an elastic force T of the coil spring 20. Moreover, a force $F_2$ is a pressing force of the lower vibration element unit 22 that is produced by the moment around the guiding shaft 17 due to the elastic force T of the coil spring 20 Further, a force $f_2$ is a pressing force of the lower vibration element unit 22 that is produced by the moment around the guiding shaft 17 due to the pressing force G of the torsion spring 30. In order to achieve the balance between the pressing force of the lower vibration element unit 22 and the pressing force of the upper vibration element unit 21, $F_1=F_2+f_2$ should be achieved. $F_1$ is calculated by $T\times b_1/a_1$, $F_2$ is calculated by $T\times b_2/a_2$, and $f_2$ is calculated by $G\times c_2/a_2$. Based on these mathematical expressions, $a_2=(T\times b_2+G\times c_2)/(T\times b_1)\times a_1$ (expression 1) holds. In the present embodiment, the distance $a_2$ is set based on the expression 1. Accordingly, the pressing force of the lower vibration element unit 22 ($F_2+f_2$), which is produced by the resultant moment around the guiding shaft 17, can be set to be equal to the pressing force of the upper vibration element unit 21 ($F_1$), which is produced by the moment around the coupling shaft 16.

A fifth embodiment of the present invention will now be described. The fifth embodiment has basically the same structures and functions as the structures and functions of the second embodiment described above. To avoid the redundant description of the same structures and functions, only different structures and functions will now be described. In the second embodiment described above, the engagement position of the protrusion 81 and the recess 82 is disposed right over the coupling shaft 16, and the distance $a_1$ is set to be equal to the distance $a_2$. In the fifth embodiment, the engagement position of the protrusion 81 and the recess 82 is not disposed right over the coupling shaft 16, and the distance $a_1$ is set to be different from the distance $a_2$, which is different to the second embodiment.

Figure 11:
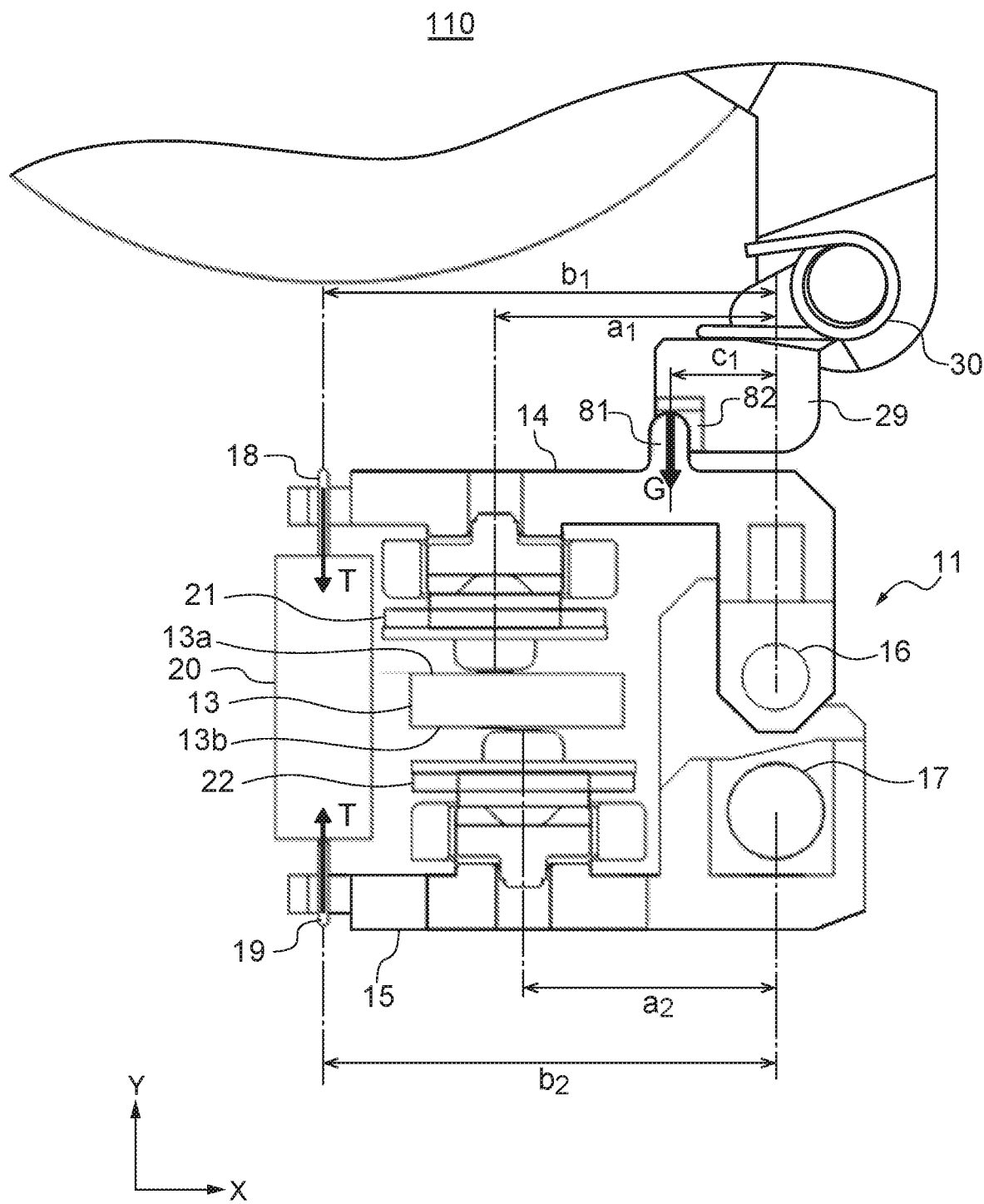
FIG. 11 is an enlarged cross-sectional view showing a balancing structure for achieving a balance between pressing forces of respective vibration element units in a fifth embodiment of the present invention.

FIG. 11 is an enlarged cross-sectional view showing a balancing structure for achieving a balance between pressing forces of respective vibration element units in the present embodiment. As shown in FIG. 11, the coupling member 29 is coupled to the upper base 14, and a distance $c_1$ is a distance between the coupling shaft 16 and the engagement position of the protrusion 81 and the recess 82 in the direction parallel to the upper contact surface 13a of the friction member 13. The direction parallel to the upper contact surface 13a of the friction member 13 is in the direction X in the drawing.

In a linear driving mechanism 110, as shown in FIG. 11, the engagement position of the protrusion 81 and the recess 82 is not disposed right over the coupling shaft 16. In this configuration, the pressing force G of the torsion spring 30 is transmitted to the upper base 14 via the coupling member 29, and the direction of the pressing force G is not directed to the center of the coupling shaft 16 and does not intersect with the center of the coupling shaft 16. Under the circumstances, the pressing force G of the torsion spring 30 produces a moment around the coupling shaft 16. This means that the resultant moment around fee coupling shaft 16 of the upper base 14 becomes greater than the moment around the guiding shaft 17 of the lower base 15. To solve this problem, the distance as is set to be longer than the distance as in the present embodiment, in a case where the distance $a_1$ corresponds to a distance between a fulcrum and a point of application when the upper base 14 is assumed to be a lever and the distance $a_2$ corresponds to a distance between a fulcrum and a point of application when the lower base 15 is assumed to be a lever. Also in the present embodiment, the distance $b_1$ corresponds to the distance between the fulcrum and the point where force is applied when the upper base 14 is assumed to be a lever, and the distance $b_2$ corresponds to the distance between the fulcrum and the point where force is applied when the lower base 15 is assumed to be a lever. Also in the present embodiment, the distance $b_1$ is set to be equal to the distance $b_2$. This configuration reduces the pressing force of the upper vibration element unit 21, which is produced by the resultant moment around the coupling shaft 16 of the upper base 14, and achieves a balance between the pressing force of the upper vibration element unit 21 and the pressing force of the lower vibration element unit 22, which is produced by the moment around the guiding shaft 17 of the lower base 15.

In this embodiment, a force $f_1$ is a pressing force of the upper vibration element unit 21 that is produced by the moment around the coupling shaft 16 due to the pressing force G of the torsion spring 30. In order to achieve the balance between the pressing force of the lower vibration element unit 22 and the pressing force of the upper vibration element unit 21, $F_2=F_1+f_1$ should be achieved. $F_1$ is calculated by $T\times b_1/a_1$, $F_2$ is calculated by $T\times b_2/a_2$, and $f_1$ is calculated by $G\times c_1/a_1$. Based on these mathematical expressions, $a_1=(T\times b_1+G\times c_1)/(T\times b_2)\times a_2$ (expression 2) holds. In the present embodiment, the distance $a_1$ is set based on the expression 2. Accordingly, the pressing force of the upper vibration element unit 21 ($F_1+f_1$), which is produced by the resultant moment around the coupling shaft 16, can be set to be equal to the pressing force of the lower vibration element unit 22 ($F_2$), which is produced by the moment around the guiding shaft 17.

A sixth embodiment of the present invention will now be described. The sixth embodiment has basically the same structures and functions as the structures and functions of the fourth embodiment described above. To avoid the redundant description of the same structures and functions, only different structures and functions will now be described. In the fourth embodiment described above, the coil spring 20 is suspended vertically. In the sixth embodiment, the coil spring 20 is not suspended vertically, which is different from the fourth embodiment. In the fourth embodiment the distance $a_1$ is set to be different from the distance $a_2$. In the sixth embodiment, the distance $a_1$ is set to be equal to the distance $a_2$, which is different from the fourth embodiment.

Figure 12:
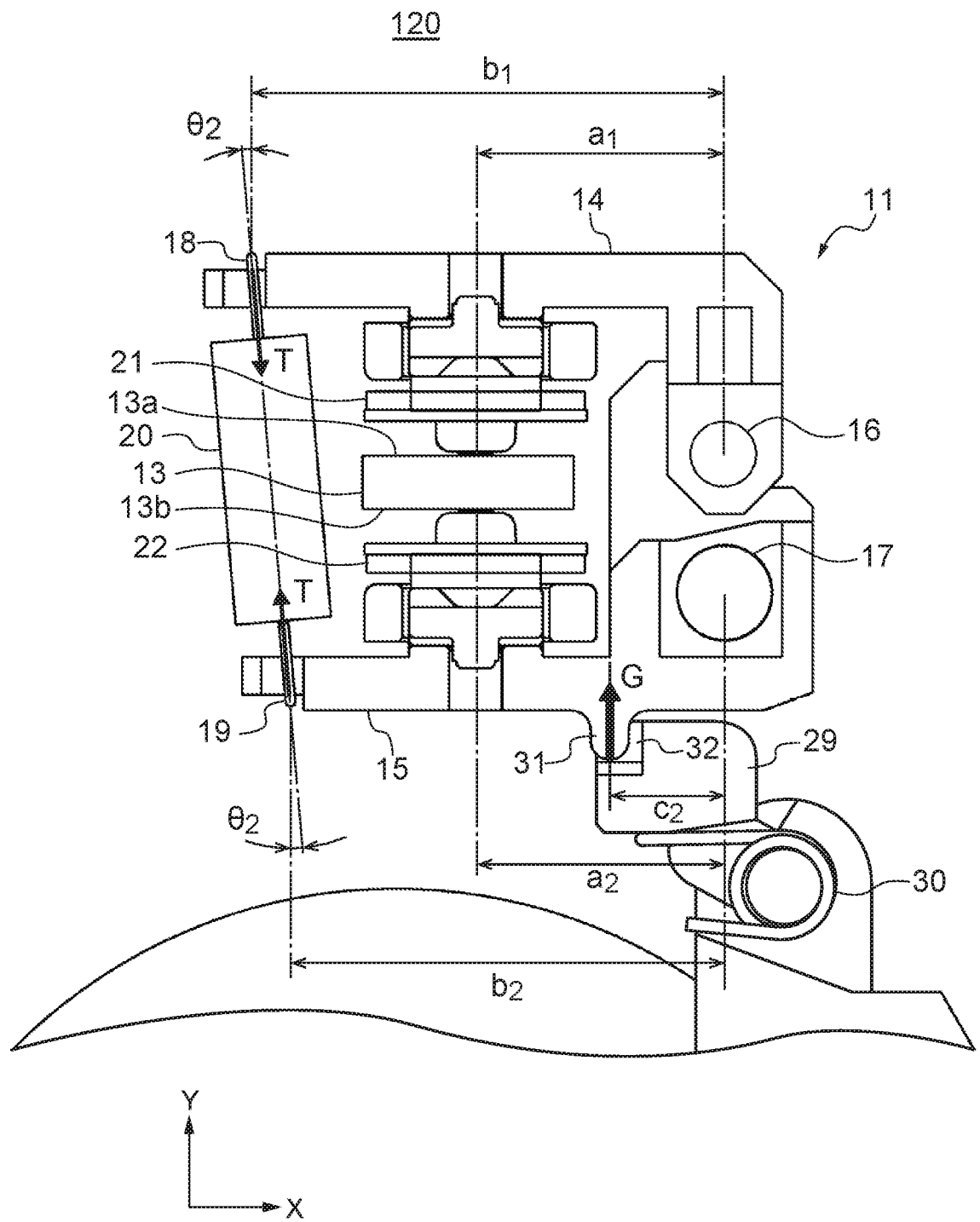
FIG. 12 is an enlarged cross-sectional view showing a balancing structure for achieving a balance between pressing forces of respective vibration element units in a sixth embodiment of the present invention.

FIG. 12 is an enlarged cross-sectional view showing a balancing structure for achieving a balance between pressing forces of respective vibration element units in the present embodiment. In a linear driving mechanism 120, as shown in FIG. 12, the engagement position of the protrusion 31 and the recess 32 is not disposed right under the guiding shaft 17. Under the circumstances, the pressing force G of the torsion spring 30 produces a moment around the guiding shaft 17. This means that the resultant moment around the guiding shaft 17 of the lower base 15 becomes greater than the moment around the coupling shaft 16 of the upper base 14. In the principle of a lever, a pressing force at a point of application can be varied by changing a distance from a fulcrum to a point of application or a point where force is applied while keeping an amount of a moment around the fulcrum at the same value. Considering this principle of a lever, the distance $b_1$ is set to be different from the distance $b_2$ in the present embodiment. Specifically, the distance $b_1$ is set to be longer than the distance $b_2$, in a case where the distance $b_1$ corresponds to a distance between a fulcrum and a point where force is applied when the upper base 14 is assumed to be a lever, and the distance $b_2$ corresponds to a distance between a fulcrum and a point where force is applied when the lower base 15 is assumed to be a lever. The distance $a_1$ corresponds to a distance between a fulcrum and a point of application when the upper base 14 is assumed to be a lever, and the distance $a_2$ corresponds to a distance between a fulcrum and a point of application when the lower base 15 is assumed to be a lever. In the linear driving mechanism 120, the distance $a_1$ is set to be equal to the distance $a_2$. This configuration increases the pressing force of the upper vibration element unit 21, which is produced by the moment around the coupling shaft 16 of the upper base 14, and achieves a balance between the pressing force of the upper vibration element unit 21 and the pressing force of the lower vibration element unit 22, which is produced by the resultant moment around the guiding shaft 17 of the lower base 15.

Since the distance $b_1$ is set to be different from the distance $b_2$ in the linear driving mechanism 120, as described above, the coil spring 20 hooked on the hooks 18 and 19 is not suspended vertically but is slanted at an angle $\theta_2$ with the vertical direction (the direction Y in the drawing), for example. To achieve the balance between the pressing force of the upper vibration element unit 21 and the pressing force of the lower vibration element, unit 22, $F_1=F_2+f_2$ should be achieved. $F_1$ is calculated by $T \cdot \cos \theta_2 \times b_1/a_1$, $F_2$ is calculated by $T \cdot \cos \theta_2 \times b_2/a_2$, and $f_2$ is calculated by $G \times c_2/a_2$. As mentioned above, in the linear driving mechanism 120, since the distance $a_1$ is set to be equal to the distance $a_2$, an expression of $a_1=a_2$ holds. Based on these mathematical expressions, $b_2=b_1-G \times c_2/(T \cdot \cos \theta_2)$ (expression 3) holds. In the present embodiment, the distance $b_2$ is set based on the expression 3. Accordingly, the pressing force of the lower vibration element unit 22 ($F_2+f_2$), which is produced by the resultant moment around the guiding shaft 17, can be set to be equal to the pressing force of the upper vibration element unit 21 ($F_1$), which is produced by the moment around the coupling shaft 16.

A seventh embodiment of the present invention will now be described. The seventh embodiment has basically the same structures and functions as the structures and functions of the fifth embodiment described above. To avoid the redundant description of the same structures and functions, only different structures and functions will now be described. In the fifth embodiment described, the coil spring 20 is suspended vertically. In the seventh embodiment, the coil spring 20 is not suspended vertically, which is different from the fifth embodiment. In the fifth embodiment, the distance $a_1$ is set to be different from the distance $a_2$. In the seventh embodiment, the distance $a_1$ is set to be equal to the distance $a_2$, which is different from the fifth embodiment.

Figure 13:
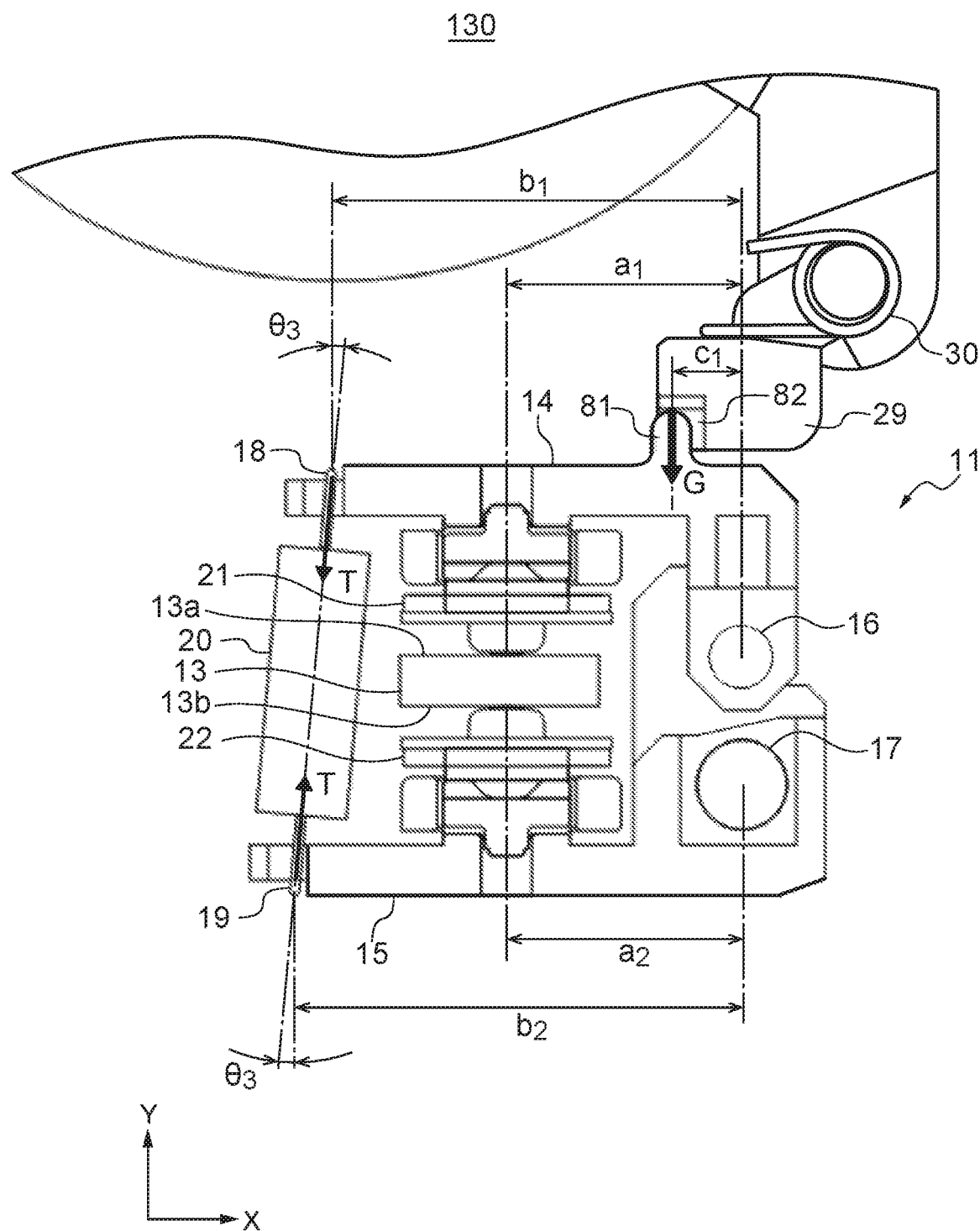
FIG. 13 is an enlarged cross-sectional view showing a balancing structure for achieving a balance between pressing forces of respective vibration element units in a seventh embodiment of the present invention.
Figure 14:
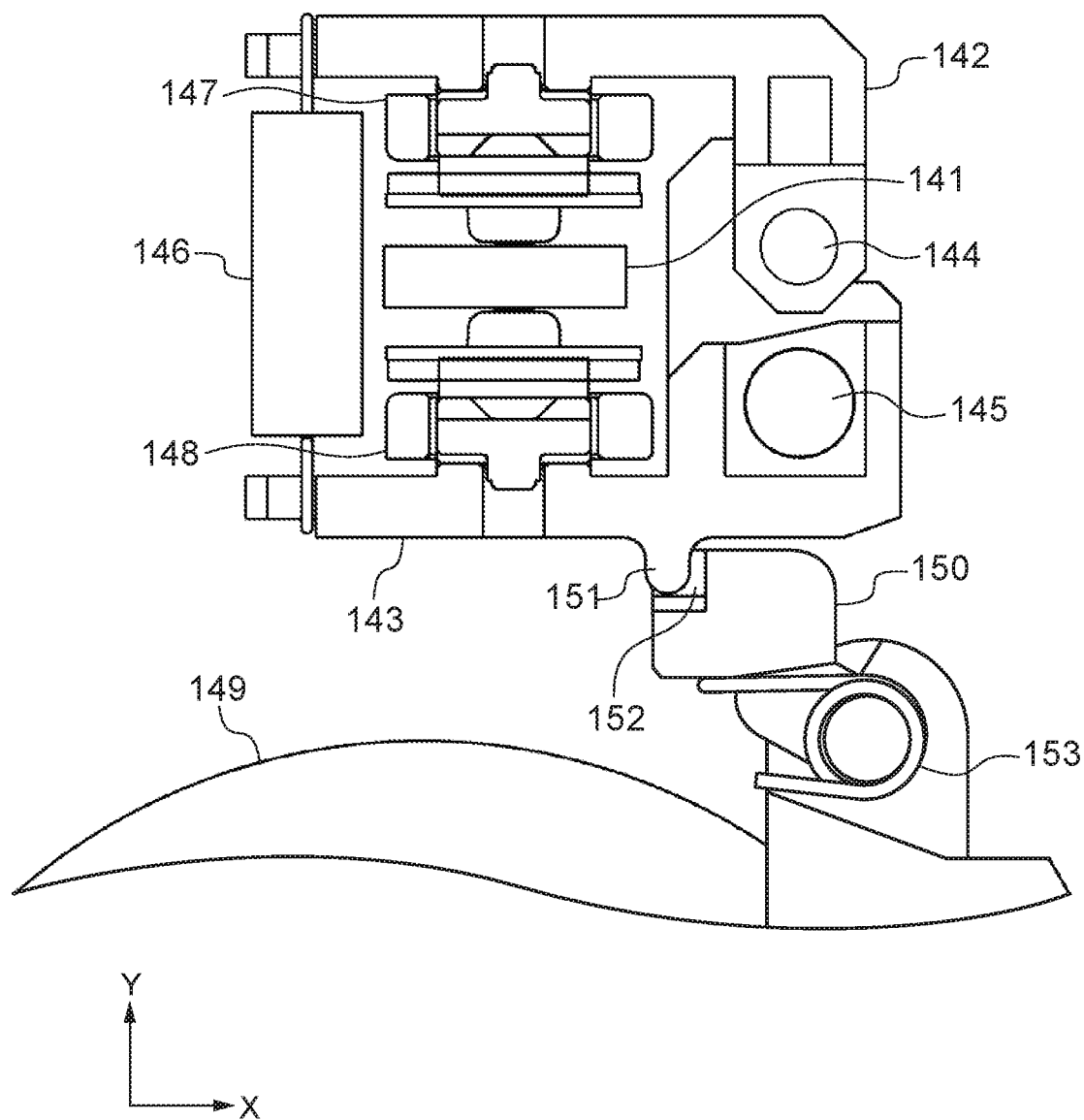
FIG. 14 is a cross-sectional view schematically showing a structure of a conventional linear driving mechanism with two ultrasonic motors.

FIG. 13 is an enlarged cross-sectional view showing a balancing structure for achieving a balance between pressing forces of respective vibration element units in the present embodiment. In a linear driving mechanism 130, as shown in FIG. 13, the engagement position of the protrusion 81 and the recess 82 is not disposed right over the coupling shaft 16. Under the circumstances, the pressing force G of the torsion spring 30 produces a moment around the coupling shaft 16, This means that the resultant moment around the coupling shaft 16 of the upper base 14 becomes greater than the moment around the guiding shaft 17 of the lower base 15. To solve this problem, the distance $b_2$ is set to be longer than the distance $b_1$ in the present embodiment, in a case where the distance $b_1$ corresponds to a distance between a fulcrum and a point where force is applied when the upper base 14 is assumed to be a lever, and the distance $b_2$ corresponds to the distance between the fulcrum and the point where force is applied when the lower base 15 is assumed to be a lever. The distance $a_1$ corresponds to a distance between a fulcrum and a point of application when the upper base 14 is assumed to be a lever, and the distance $a_2$ corresponds to a distance between a fulcrum and a point of application when the lower base 15 is assumed to be a lever. In the linear driving mechanism 130, the distance $a_1$ is set to be equal to the distance $a_2$. This configuration increases the pressing force of the lower vibration element unit 22, which is produced by the moment around the guiding shaft 17 of the lower base 15, and achieves a balance between the pressing force of the lower vibration element unit 22 and the pressing force of the upper vibration element unit 21, which is produced by the resultant moment around the coupling shaft 16 of the upper base 14.

Since the distance $b_1$ is set to be different from the distance $b_2$ in the linear driving mechanism 130 as in the sixth embodiment, the coil spring 20 hooked on the hooks 18 and 19 is not suspended vertically but slanted at an angle $\theta_3$ with the vertical direction. To achieve the balance between the pressing force of the lower vibration element unit 22 and the pressing force of the upper vibration element unit 21, $F_2=F_1+f_1$ should be achieved. $F_1$ is calculated by $T \cdot \cos \theta_3 \times b_1/a_1$, $F_2$ is calculated by $T \cdot \cos \theta_3 \times b_2/a_2$, and $f_1$ is calculated by $G \times c_1/a_1$. As mentioned above, in the linear driving mechanism 130, since the distance $a_1$ is set to be equal to the distance $a_2$, an expression of $a_1=a_2$ holds. Based on these mathematical expressions, $b_1=b_2-G \times c_1/(T \cdot \cos \theta_3)$ (expression 4) holds. In the present embodiment, the distance $b_1$ is set based on the expression 4. Accordingly, the pressing force of the upper vibration element unit 21 ($F_1+f_1$), which is produced by the resultant moment around the coupling shaft 16, can be set to be equal to the pressing force of the lower vibration element unit 22 ($F_2$), which is produced by the moment around the guiding shaft 17.

Other Embodiments

While the present invention has been described with reference to exemplary embodiments, it Is to be understood that the invention is not limited to the disclosed exemplary embodiments. The scope of the following claims is to be accorded the broadest interpretation so as to encompass all such modifications and equivalent structures and functions. The linear driving mechanism 10 described above may be applied to any mechanism for driving a driven object that moves substantially in a linear manner, as well as to a lens barrel of a camera. For example, the linear driving mechanism 10 may be applied to a stage moving apparatus for driving a driven object holding a stage along a linear guiding shaft.

This application claims the benefit of Japanese Patent Application No. 2017-117673, filed Jun. 15, 2017, which is hereby incorporated by reference herein in its entirety.

What is claimed is:

1. A linear driving mechanism comprising:
   a first vibration element and a second vibration element, the first and second vibration elements being disposed in touch with a friction member so that the friction member is sandwiched between the first and second vibration elements;
   a first holding member configured to hold the first vibration element, the first holding member being rotatably supported by a first shaft extending parallel to a movement direction of a moving body;
   a second holding member configured to hold the second vibration element, the second holding member being rotatably supported by a second shaft extending parallel to the movement direction;
   an urging part configured to move the first holding member around the first shaft to press the first vibration element against the friction member, and to move the second holding member around the second shaft to press the second vibration element against the friction member;

a coupling member configured to couple the first holding member or the second holding member with a driven object; and
a pressing part configured to press the coupling member against the moving body,
wherein a direction of a pressing force of the pressing part intersects with the first shaft when the coupling member couples with the first holding member, and the direction of the pressing force of the pressing part intersects with the second shaft when the coupling member couples with the second holding member.

2. The linear driving mechanism according to claim 1, wherein one of the coupling member and the moving body has a recess depressed in a pressing direction of the coupling member, and the other of the coupling member and the moving body has a protrusion configured to engage with the recess.

3. An image pickup apparatus, comprising:
a linear driving mechanism;
an optical member held by a driven object; and
a guiding member configured to guide the driven object along a movement direction of a moving body,
wherein the linear driving mechanism includes:
  a first vibration element and a second vibration element, the first and second vibration elements being disposed in touch with a friction member so that the friction member is sandwiched between the first and second vibration elements;
  a first holding member configured to hold the first vibration element, the first holding member being rotatably supported by a first shaft extending parallel to the movement direction of the moving body;
  a second holding member configured to hold the second vibration element, the second holding member being rotatably supported by a second shaft extending parallel to the movement direction;
  an urging part configured to move the first holding member around the first shaft to press the first vibration element against the friction member, and to move the second holding member around the second shall to press the second vibration element against the friction member;
  a coupling member configured to couple the first holding member or the second holding member with the driven object; and
  a pressing part configured to press the coupling member against the moving body,
wherein a direction of a pressing force of the pressing part intersects with the first shaft when the coupling member couples with the first holding member, and the direction of the pressing force of the pressing part intersects with the second shaft when the coupling member couples with the second holding member.

4. A lens barrel comprising:
a linear driving mechanism;
an optical member held by a driven object; and
a guiding member con figured to guide the driven object along a movement direction of a moving body,
wherein the linear driving mechanism includes:
  a first vibration element and a second vibration element, the first and second vibration elements being disposed in touch with a friction member so that the friction member is sandwiched between the first and second vibration elements;
  a first holding member configured to hold the first vibration element, the first holding member being rotatably supported by a first shaft extending parallel to the movement direction of the moving body;
  a second holding member configured to hold the second vibration element, the second holding member being rotatably supported by a second shaft extending parallel to the movement direction;
  an urging part configured to move the first holding member around the first shaft to press the first vibration element against the friction member, and to move the second holding member around the second shaft to press the second vibration element against the friction member;
  a coupling member configured to couple the first holding member or the second holding member with the driven object; and
  a pressing part configured to press the coupling member against the moving body,
wherein a direction of a pressing force of the pressing part intersects with the first shaft when the coupling member couples with the first holding member, and the direction of the pressing force of the pressing part intersects with the second shaft when the coupling member couples with the second holding member.

5. An apparatus for moving a stage comprising:
the linear driving mechanism according to claim 1;
a stage held by the driven object; and
a guiding member configure to guide the driven object along the movement direction of the moving body.

6. A linear driving mechanism comprising:
a first vibration element and a second vibration element, the first and second vibration elements being disposed in touch with a friction member so that the friction member is sandwiched between the first and second vibration elements;
a first holding member configured to hold the first vibration element the first holding member being rotatably supported by a first shaft extending parallel to a movement direction of a moving body;
a second holding member configured to hold the second vibration element, the second holding member being rotatably supported by a second shaft extending parallel to the movement direction;
an urging part configured to move the first holding member around the first shaft to press the first vibration element against the friction member, and to move the second holding member around the second shaft to press the second vibration element against the friction member;
a coupling member configured to couple the first holding member or the second holding member with a driven object;
a pressing part configured to press the coupling member against the moving body; and
a balancing structure configured to achieves balance between a pressing force of the first vibration element to the friction member and a pressing force of the second vibration element to the friction member.

7. The linear driving mechanism according to claim 6, wherein $a_1 > a_2$ holds in the balancing structure when the coupling member couples with the first holding member, and $a_2 > a_1$ holds in the balancing structure when the coupling member couples with the second holding member,
where $a_1$ is a first distance between the center of the first shaft and a contact point of the first vibration element with the friction member in a direction parallel to a contact surface of the friction member with the first vibration element, and $a_2$ is a second distance between the center of the second shaft and a contact point of the second vibration element with the friction member in a direction parallel to another contact surface of the friction member with the second vibration element.

8. The linear driving mechanism according to claim 7, wherein $a_1=(T\times b_1+G\times c_1)/(T\times b_2)\times a_2$ holds in the balancing structure when the coupling member couples with the first holding member, and $a_2=(T\times b_2+G\times c_2)/(T\times b_1)\times a_1$ holds in the balancing structure when the coupling member couples with the second holding member, where T is an urging force of the urging part, G is a pressing force of the pressing part, $b_1$ is a distance between the first shaft and an engagement position of the urging part and the first holding member in the direction parallel to the contact surface of the friction member with the first vibration element, $b_2$ is a distance between the second shaft and an engagement position of the urging part and the second holding member in the direction parallel to the other contact surface of the friction member with the second vibration element, $c_1$ is a distance between the first shaft and a pressing position of the coupling member on the first holding member in the direction parallel to the contact surface of the friction member with the first vibration element, and $c_2$ is a distance between the second shaft and a pressing position of the coupling member on the second holding member in the direction parallel to the other contact surface of the friction member with the second vibration element.

9. The linear driving mechanism according to claim 6, wherein $b_2>b_1$ holds in the balancing structure when the coupling member couples with the first holding member, and $b_1>b_2$ holds in the balancing structure when the coupling member couples with the second holding member, where $b_1$ is a distance between the first shaft and an engagement position of the urging part and the first holding member in a direction parallel to a contact surface of the friction member with the first vibration element, and $b_2$ is a distance between the second shaft and an engagement position of the urging part and the second holding member in a direction parallel to another contact surface of the friction member with the second vibration element.

10. The linear driving mechanism according to claim 9, wherein $b_1=b_2-G\times c_1/(T\cdot\cos\theta)$ holds in the balancing structure when the coupling member couples with the first holding member, and $b_2=b_1-G\times c_2/(T\cdot\cos\theta)$ holds in the balancing structure when the coupling member couples with the second holding member, where T is an urging force of the urging part, G is a pressing force of the pressing part, $\theta$ is a slant angle of the urging pan with respect to the direction parallel to the contact surface of the friction member with the first vibration element, $c_1$ is a distance between the first shaft and a pressing position of the coupling member on the first holding member in the direction parallel to the contact surface of the friction member with the first vibration element, and $c_2$ is a distance between the second shaft and a pressing position of the coupling member on the second holding member in the direction parallel to the other contact surface of the friction member with the second vibration element.

11. The linear driving mechanism according to claim 6, wherein one of the coupling member and the moving body has a recess depressed in a pressing direction of the coupling member, and the other of the coupling member and the moving body has a protrusion configured to engage with the recess.

12. An image pickup apparatus comprising:
a linear driving mechanism;
an optical member held by a driven object; and
a guiding member configured to guide the driven object along a movement direction of a moving body,
wherein the linear driving mechanism includes:
    a first vibration element and a second vibration element, the first and second vibration elements being disposed in touch with a friction member so that the friction member is sandwiched between the first and second vibration elements;
    a first holding member configured to hold the first vibration element, the first holding member being rotatably supported by a first shaft extending parallel to the movement direction of the moving body;
    a second holding member configured to hold the second vibration element, the second holding member being rotatably supported by a second shaft extending parallel to the movement direction;
    an urging part configured to move the first holding member around the first shaft to press the first vibration element against the friction member, and to move the second holding member around the second shaft to press the second vibration element against the friction member;
    a coupling member configured to couple the first holding member or the second holding member with the driven object;
    a pressing part configured to press the coupling member against the moving body; and
    a balancing structure configured to achieve a balance between a pressing force of the first vibration element to the friction member and a pressing force of the second vibration element to the friction member.

13. A lens barrel comprising:
a linear driving mechanism;
an optical member held by a driven object; and
a guiding member configured to guide the driven object along a movement direction of a moving body,
wherein the linear driving mechanism includes:
    a first vibration element and a second vibration element, the first and second vibration elements being disposed in touch with a friction member so that the friction member is sandwiched between the first and second vibration elements;
    a first holding member configured to hold the first vibration element, the first holding member being rotatably supported by a first shaft extending parallel to the movement direction of the moving body;
    a second holding member configured to hold the second vibration element, the second holding member being rotatably supported by a second shaft extending parallel to the movement direction;
    an urging part configured to move the first holding member around the first shaft to press the first vibration element against the friction member, and to move the second holding member around the second shaft to press the second vibration element against the friction member;
    a coupling member configured to couple the first holding member or the second holding member with the driven object;
    a pressing part configured to press the coupling member against the moving body; and a balancing structure configured to achieve a balance between a pressing force of the first vibration element to the friction member and a pressing force of the second vibration element to the friction member.

14. An apparatus for moving a stage comprising:

the linear driving mechanism according to claim 6;

a stage held by the driven object; and a guiding member configured to guide the driven object along the movement direction of the moving body.

* * * * *